(12) United States Patent
Hoshino

(10) Patent No.: US 10,356,072 B2
(45) Date of Patent: Jul. 16, 2019

(54) DATA PROCESS SYSTEM, DATA PROCESS APPARATUS, AND DATA PROTECTION METHOD

(71) Applicant: Tatsuya Hoshino, Kanagawa (JP)

(72) Inventor: Tatsuya Hoshino, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 162 days.

(21) Appl. No.: 15/171,060

(22) Filed: Jun. 2, 2016

(65) Prior Publication Data

US 2016/0359834 A1  Dec. 8, 2016

(30) Foreign Application Priority Data

Jun. 4, 2015  (JP) ................. 2015-114216
Feb. 8, 2016  (JP) ................. 2016-022201

(51) Int. Cl.
  *H04L 29/06*  (2006.01)
  *H04L 29/08*  (2006.01)

(52) U.S. Cl.
  CPC ............ *H04L 63/08* (2013.01); *H04L 63/083* (2013.01); *H04L 63/0807* (2013.01); *H04L 67/02* (2013.01); *H04L 63/0435* (2013.01)

(58) Field of Classification Search
  CPC ..... H04L 63/08; H04L 67/02; H04L 63/0807; H04L 63/0435
  See application file for complete search history.

(56) References Cited

U.S. PATENT DOCUMENTS

| | | | |
|---|---|---|---|
| 9,582,603 B1 * | 2/2017 | Acharya | ........... G06F 17/30902 |
| 2002/0010860 A1 * | 1/2002 | Chu | ................... H04L 63/0435 |
| | | | 713/182 |
| 2006/0075474 A1 * | 4/2006 | Takeuchi | ............... G06F 21/41 |
| | | | 726/5 |
| 2009/0158035 A1 * | 6/2009 | Stultz | .................. H04L 63/0442 |
| | | | 713/160 |
| 2010/0257351 A1 * | 10/2010 | O'Connor | ............ H04L 9/0894 |
| | | | 713/150 |
| 2014/0090028 A1 * | 3/2014 | Matsugashita | .......... H04L 63/08 |
| | | | 726/4 |
| 2015/0341518 A1 * | 11/2015 | Shimizu | ............. H04N 1/00209 |
| | | | 358/1.15 |

FOREIGN PATENT DOCUMENTS

| | | |
|---|---|---|
| JP | 2006-072990 | 3/2006 |
| JP | 2010-193054 | 9/2010 |
| JP | 2010-257289 | 11/2010 |
| JP | 2014-132448 | 7/2014 |

* cited by examiner

*Primary Examiner* — Daniel B Potratz
*Assistant Examiner* — Vu V Tran
(74) *Attorney, Agent, or Firm* — IPUSA, PLLC

(57) ABSTRACT

A system includes a shared device that is shared by users, the shared device including a browser that allows each of the plurality of users to access a web service, and a process apparatus that provides contents to be displayed on the browser. The process apparatus includes a processor that executes a process including authenticating a user of the users that operates the shared device, providing the key to the shared device, and providing a program to the shared device. The program adds a function to the browser. The shared device includes a processor that executes a process including executing the program to encrypt data by using the key when storing the data in the storage, and executing the program to decrypt the encrypted data by using the key when obtaining the data from the storage.

18 Claims, 17 Drawing Sheets

FIG.9

| USER ID | PASSWORD | AUTHENTICATION TICKET | USER SECRET KEY |
|---|---|---|---|
| user1 | password1 | tmsuzfyoihrgkndaxwlpe | jrwiapdxbfsletqgchmuoynzkv |
| user2 | password2 | znmisgkuehjlqxypbvtra | dhvlkgjepoxwaziunsbfrtyqcm |
| user3 | password3 | null | null |

FIG.10

| USER ID | USER CONFIDENTIAL INFORMATION |
|---|---|
| user1 | user1_secret |
| user2 | user2_secret |
| user3 | user3_secret |

FIG.11

| USER ID | ENCRYPTED USER CONFIDENTIAL INFORMATION |
|---|---|
| user1 | U2FsdGVkX1+DHQ5aUpBr1iQu0hTcG6fsz22ai1QITYg= |
| user2 | U2FsdGVkX1/AvTI1w5ijWUbdC7SghKJCB5JEYtcQ6/Y= |

DATA PROCESS SYSTEM, DATA PROCESS APPARATUS, AND DATA PROTECTION METHOD

BACKGROUND OF THE INVENTION

1. Field of the Invention

The present invention relates to a data process system, a data process apparatus, and a data protection method.

2. Description of the Related Art

In recent years, a local storage is provided in a web browser that allows data to be persistently stored on the side of the web browser. Further, web services are widely used for providing services by way of web browsers. Such web services protect the user's data by user authentication.

SUMMARY OF THE INVENTION

The present invention may provide a data process system, a data process apparatus, and a data protection method that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a data process system, a data process apparatus, and a data protection method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a system including a shared device that is shared by users, the shared device including a browser having a storage that cannot divided in correspondence with each of the users, and a process apparatus that provides contents to be displayed on the browser. The process apparatus includes a processor that executes a process including authenticating a user of the users that operates the shared device, managing a key associated with the authenticated user, providing the key to the shared device, and providing a program to the shared device. The program adds a function to the browser. The shared device includes a processor that executes a process including executing the program to encrypt information by using the key when storing the information in the storage, and executing the program to decrypt the encrypted information by using the key when obtaining the information from the storage.

Other objects, features and advantages of the present invention will become more apparent from the following detailed description when read in conjunction with the accompanying drawings.

BRIEF DESCRIPTION OF THE DRAWINGS

FIG. 9 is a schematic diagram illustrating an example of a user authentication information table that is retained in an authentication unit according to an embodiment of the present invention;

FIG. 10 is a schematic diagram illustrating an example of a user confidential information table retained in a user confidential information management unit according to an embodiment of the present invention;

FIG. 11 is a schematic diagram illustrating an example of a user confidential information table that is retained in a persisting unit according to an embodiment of the present invention;

DETAILED DESCRIPTION OF THE PREFERRED EMBODIMENTS

In a case where a web browser obtains a user's data from a web service and stores the user's data in a local storage (persisting area) of the web browser, the following difficulties may occur.

Figure 1:
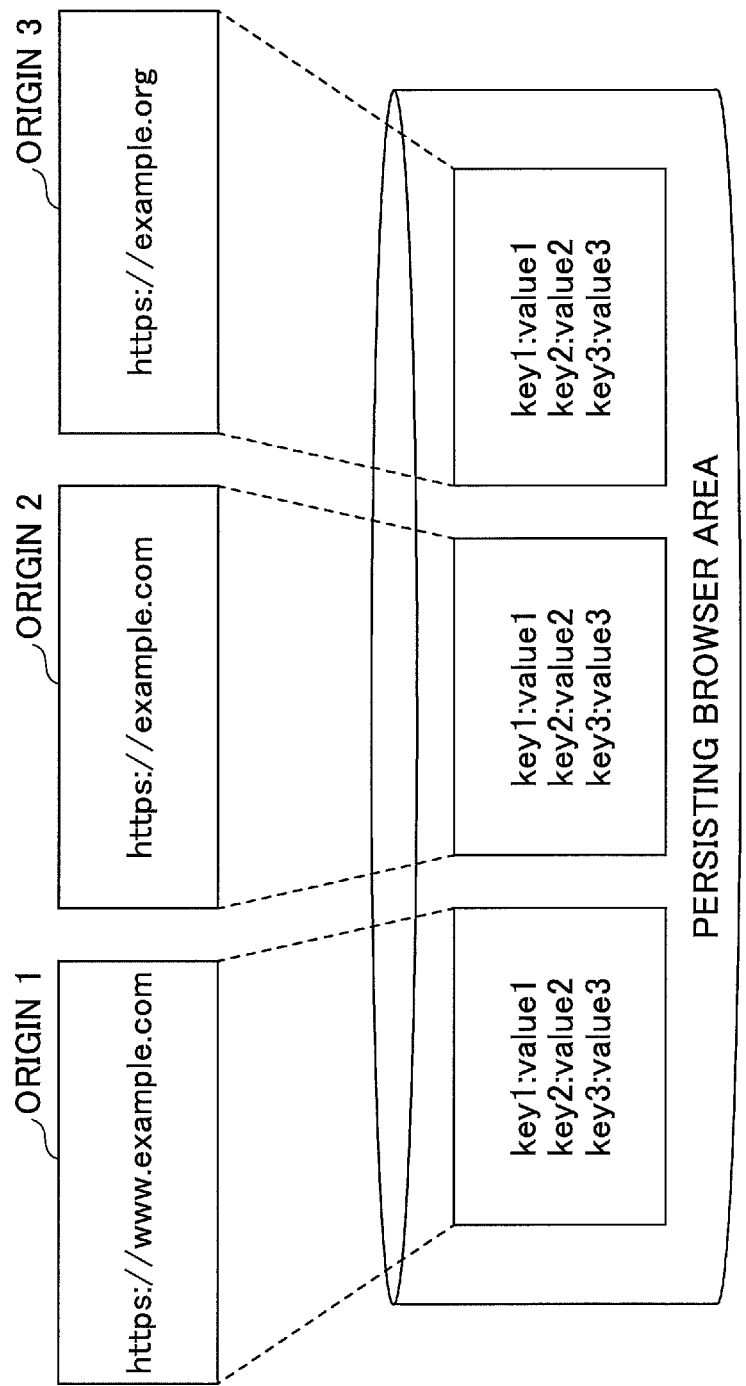
FIG. 1 is a schematic diagram illustrating an example of a method for storing data in a persisting area of a web browser.

As illustrated in FIG. 1, the persisting area of the web browser is shared by each origin of the web service. FIG. 1 is a schematic diagram illustrating an example of a method for storing data in a persisting area of a web browser. Note that an "origin" is a combination of a protocol, a domain name, and a port number. One example of an origin is "https://www.example.com.443".

Figure 2:
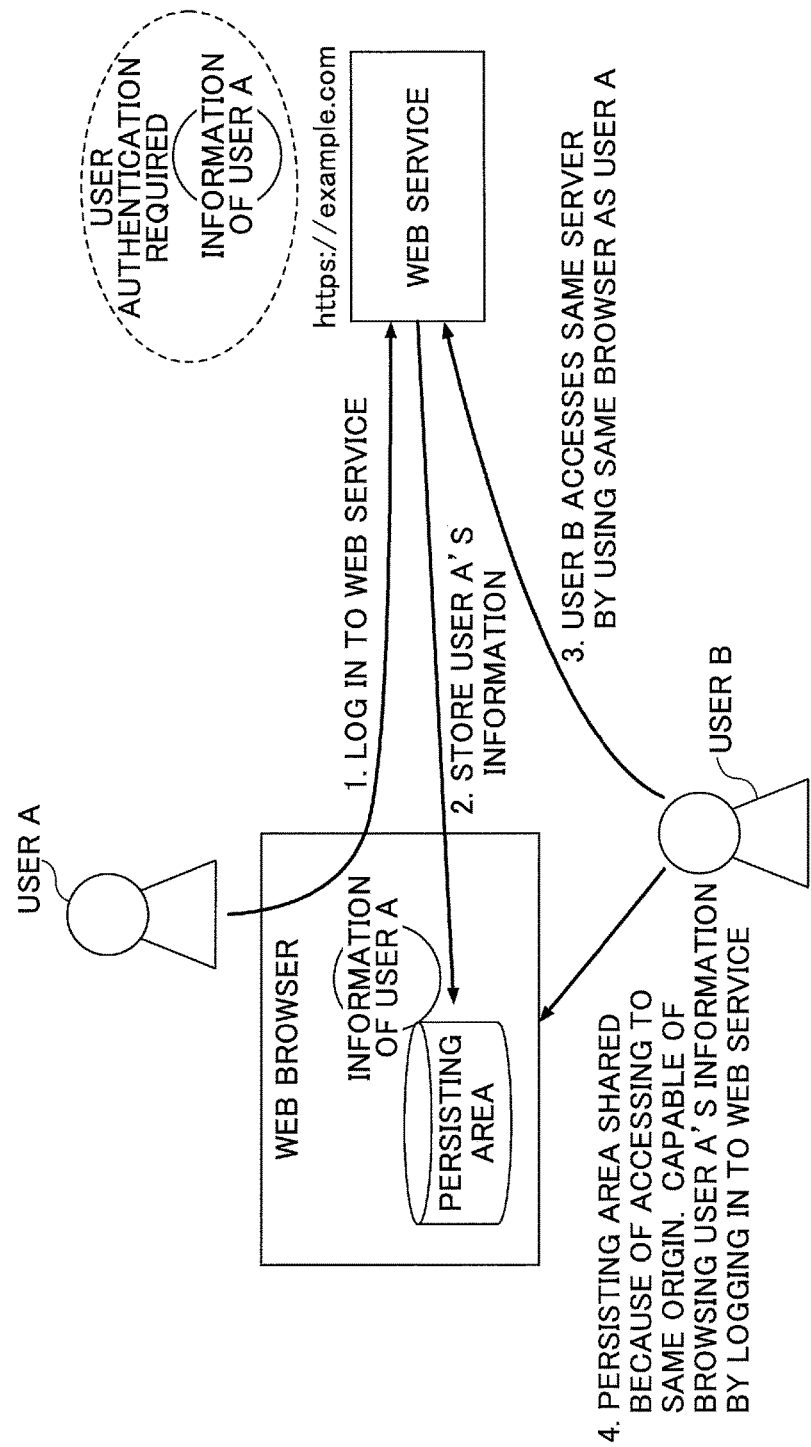
FIG. 2 is a schematic diagram illustrating a data process system for describing the possibility in which a user's personal information may be browsed by another user.

In a case where multiple users sharing a single web browser accesses the same web service, there is a possibility in which personal information of a user "A" may be browsed by another user "B" as illustrated in FIG. 2. FIG. 2 is a schematic diagram illustrating a data process system 1 for describing the possibility in which a user's personal information may be browsed by another user.

Because an area for storing user data in a web browser operated by a PC is divided in correspondence with each log-in user of an operating system (OS), the persisting area of the web browser is often divided in correspondence with each user. Therefore, the possibility described above with FIG. 2 is low.

However, in a case where a web browser operated by an electronic device is shared by multiple users (e.g., multi-peripheral device, projector), the storage area of most web browsers is not divided with respect to each of the multiple users. Thus, the possibility described with FIG. 2 is high. That is, with a web browser that operates in an electronic device (shared device) shared by multiple users, a security risk may arise when a user's personal information is stored in a persisting area of the web browser.

In the following, embodiments of the present invention are described in detail. Although an image forming apparatus is described as an example of an electronic device (shared device) shared by multiple users in the following embodiments, the shared device is not limited to the image forming apparatus. For example, the shared device may be a projector, a conference system, a television set, a recorder, a camera, an electronic blackboard (e.g., IWB (Interactive White Board), or the like.

First Embodiment

Figure 3:
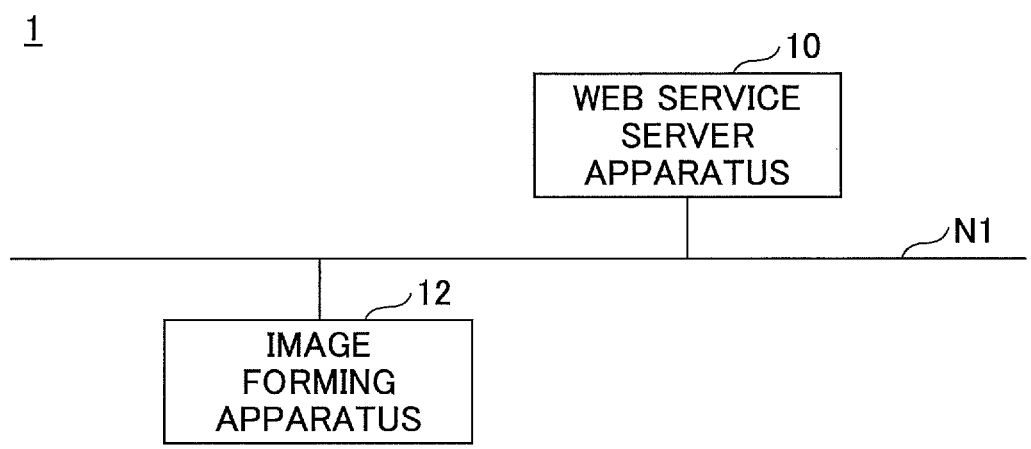
FIG. 3 is a schematic diagram illustrating a data process system according to an embodiment of the present invention.

FIG. 3 is a schematic diagram illustrating the data process system 1 according to an embodiment of the present invention. The data process system 1 of FIG. 3 includes a web service server apparatus 10 and an image forming apparatus 12 that are connected to each other by way of a network N1 (e.g., LAN (Local Area Network), the Internet). Each of the web service server apparatus 10 and the image forming apparatus 12 includes a communication unit 20, 30 capable of performing wired (cable) or wireless communication. Although FIG. 3 depicts the data process system 1 including one web service server apparatus 10 and one image forming apparatus 12, the data process system 1 may include multiple web service server apparatuses 10 and/or multiple image forming apparatuses 12.

The web service server apparatus 10 is implemented by one or more data process apparatuses. The web service server apparatus 10 provides a web service described below. As described above, the image forming apparatus 12 is one example of an electronic device (shared device) shared by multiple users. The image forming apparatus 12 may be a multi-function peripheral, a projector, or the like. Alternatively, the image forming apparatus 12 may be a printer, a copy machine, a laser printer, an electronic blackboard, or a television set. Note that the data process system 1 is merely one example. The data process system 1 may include multiple data process apparatuses that provide a function(s) of the web service server apparatus 10.

<Hardware Configuration>

Figure 4:
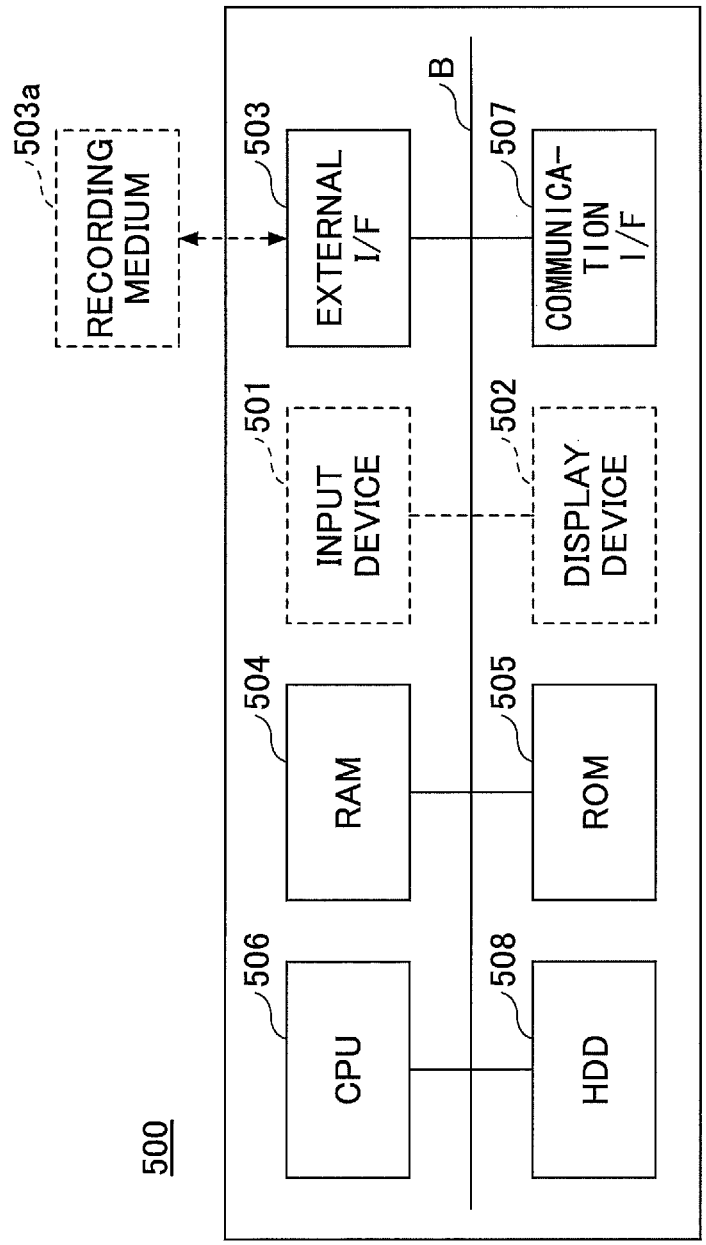
FIG. 4 is a schematic diagram illustrating a hardware configuration of a web service server apparatus according to an embodiment of the present invention.

The web service server apparatus 10 of FIG. 3 may be implemented by a computer 500 having a hardware configuration illustrated in FIG. 4.

The computer 500 of FIG. 4 includes an input device 501, a display device 502, an external I/F (interface) 503, a RAM (Random Access Memory) 504, a ROM (Read Only Memory) 505, a CPU (Central Processing Unit) 506, a communication I/F 507, and an HDD (Hard Disk Drive) 508 that are connected to each other by way of a bus B. Alternatively, the input device 501 and the display device 502 may be connected to the computer 500 and used according to necessity.

The input device 501 includes a keyboard or a mouse. The input device 501 is used to input various operation signals input by the user. The display device 502 includes a display or the like. The display device 502 displays the process results of the computer 500.

The communication I/F 507 is an interface that connects the computer 500 to the network N1. Thereby, the computer 500 performs data communication via the communication I/F 507.

The HDD 508 is a non-volatile storage device that stores programs and data. The programs and data stored in the HDD 508 may be, for example, basic software that entirely controls the computer 500 (e.g., OS (Operating System)) and application software that provides various functions in the OS.

The external I/F 503 is an interface that connects the computer 500 with an external device. The external device may be, for example, a recording medium 500a. Thereby, the computer 500 reads data from/records data to the recording medium 500a via the external I/F 50. The recording medium 500a may be, for example, a flexible disk, a CD (Compact Disc), a DVD (Digitally Versatile Disk), an SD (Secure Digital) memory card, or a USB (Universal Serial Bus) memory.

The ROM 505 is a non-volatile semiconductor memory (storage device) that retains programs and data even when the electric power of the computer 500 is turned off. The various programs and data stored in the ROM 505 may be, for example, a BIOS (Basic Input/Output System), OS settings, and network settings that are executed when the computer 500 is activated.

The CPU 506 is an arithmetic device that implements the entire controls and functions of the computer 500. More specifically, the CPU 506 implements the functions and controls of the computer 500 by reading out programs and data stored in the ROM 505 or the HDD 508, loading the programs and data to the RAM 504, and executing various processes according to the programs and data.

The web service server 10 according to an embodiment of the present invention executes various processes described below by using the hardware configuration of the computer 500.

Figure 5:
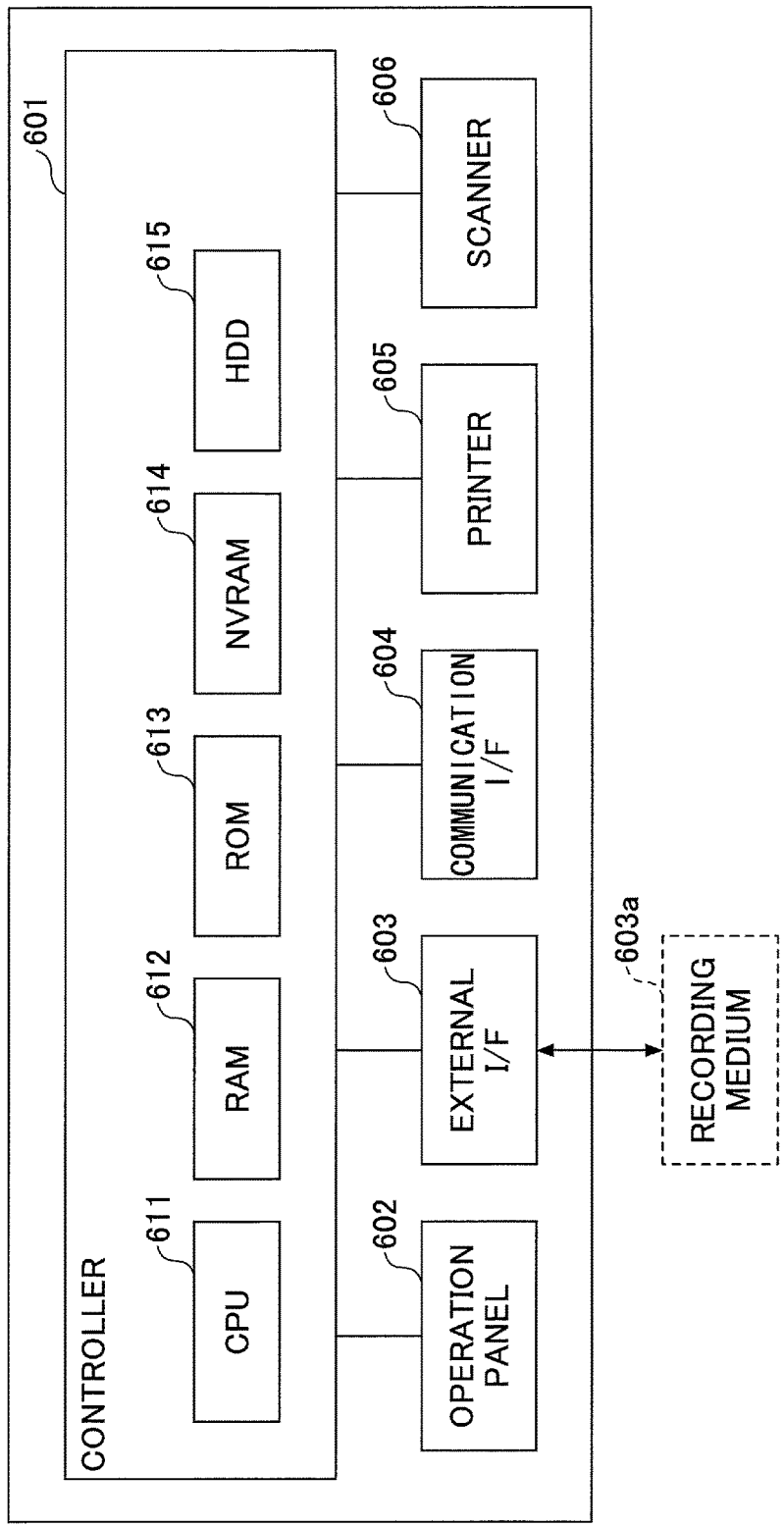
FIG. 5 is a schematic diagram illustrating an example of a hardware configuration of an image forming apparatus according to an embodiment of the present invention.
Figure 13:
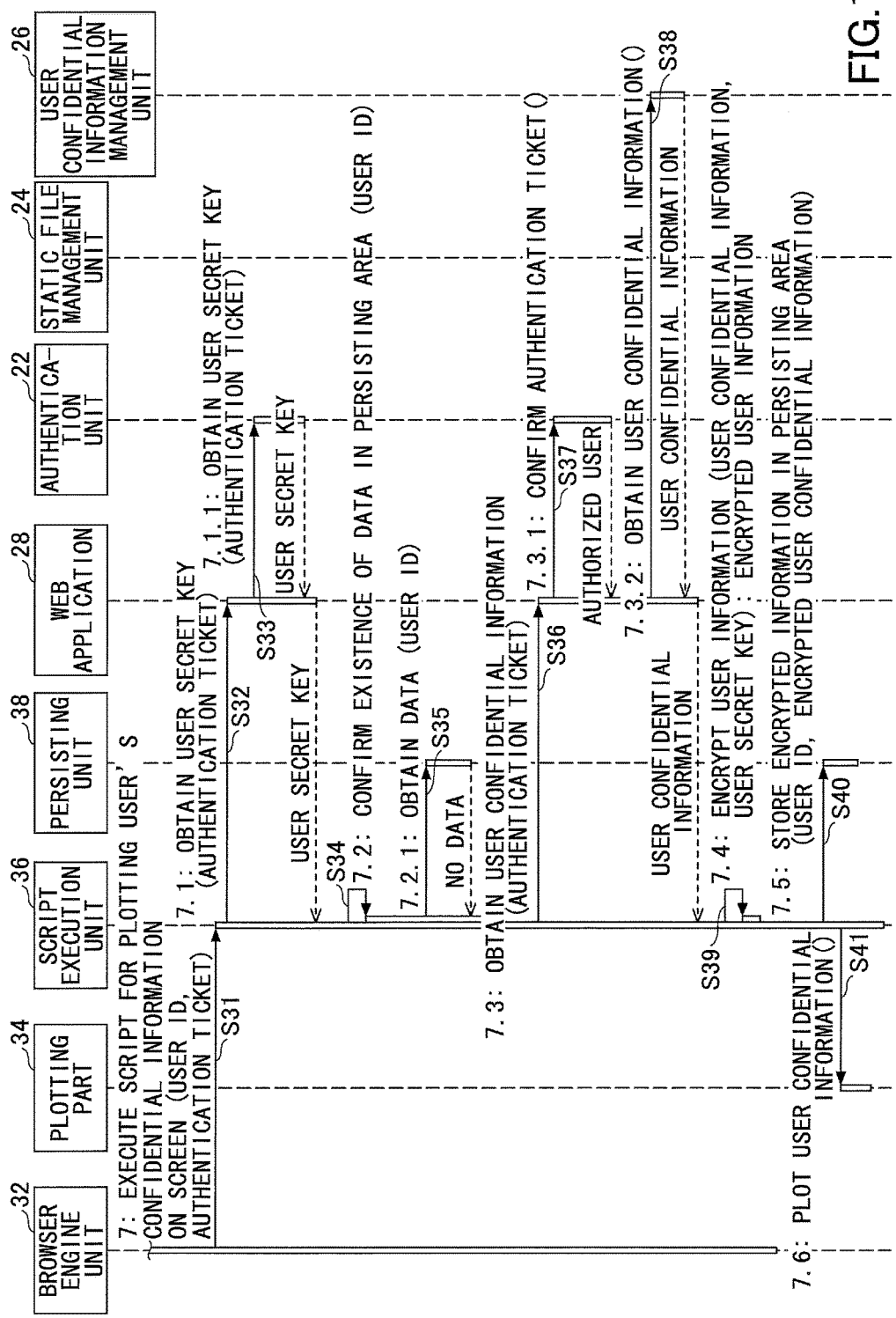
FIG. 13 is a sequence diagram illustrating a process in which a user page including user confidential information is displayed on an image forming apparatus and continuing to a process in which user confidential information is stored in a persisting area of a web browser according to an embodiment of the present invention.

The image forming apparatus 12 of FIG. 13 may be implemented by a hardware configuration illustrated in FIG. 5. FIG. 5 is a schematic diagram illustrating an example of a hardware configuration of the image forming apparatus 12.

The image forming apparatus 12 includes, for example, a controller 601, an operation panel 602, an external I/F 603, a communication I/F 604, a printer 605, and a scanner 606.

The controller 601 includes, for example, a CPU 611, a RAM 612, a ROM 613, an NVRAM 614, and an HDD 615. The ROM 613 has various programs and data stored therein. The RAM 612 temporarily retains programs and data. The NVRAM 614 stores, for example, data pertaining to settings (setting data) of the image forming apparatus 12. The HDD 615 also stores various programs and data.

The CPU 611 implements the entire controls and functions of the image forming apparatus 12. More specifically, the CPU 611 implements the functions and controls of the image forming apparatus 12 by reading out programs and data stored in the ROM 613 or the NVRAM 614, loading the programs and data to the RAM 612, and executing various processes according to the programs and data.

The operation panel 602 includes an input unit that accepts (receives) input from the user and a display unit that displays data. The external I/F 603 is an interface that connects the image forming apparatus 12 to an external device. The external device may be, for example, a recording medium 603a. Thereby, the image forming apparatus 12 reads data from/records data to the recording medium 603a via the external I/F 603. The recording medium 500a may be, for example, an IC card, a flexible disk, a CD (Compact Disc), a DVD (Digitally Versatile Disk), an SD (Secure Digital) memory card, or a USB (Universal Serial Bus) memory.

The communication I/F 604 is an interface that connects the image forming apparatus 12 to the network N1. Thereby, the image forming apparatus 12 performs data communication via the communication I/F 604. The printer 605 is a printing machine that prints, for example, printing data to a sheet(s) of paper. The scanner 606 is a scanning machine (read-out machine) that reads out, for example, image data (electronic data) from a manuscript.

<Software Configuration>

Figure 6:
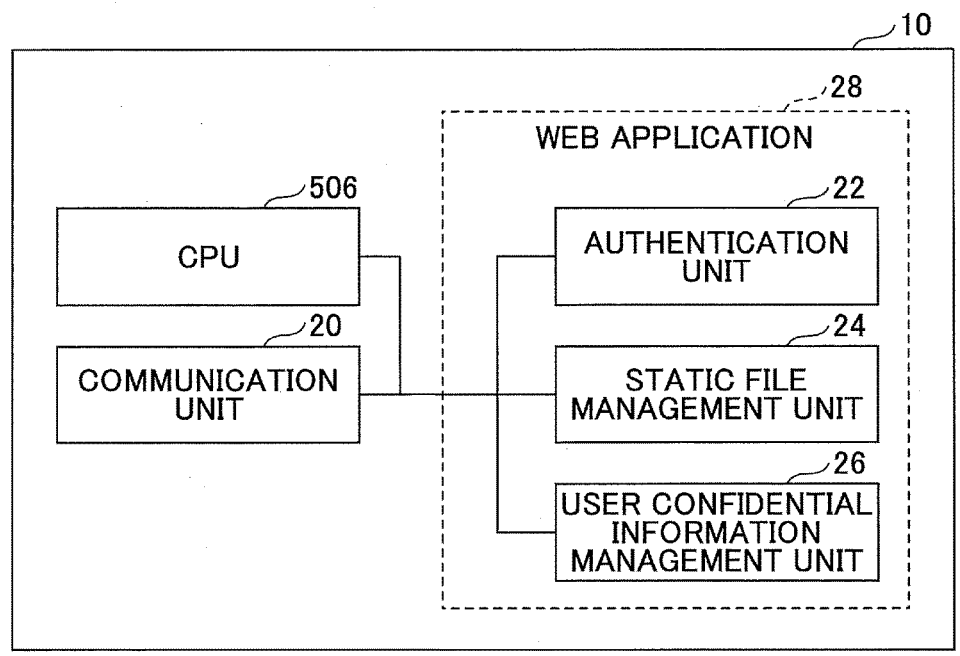
FIG. 6 is a block diagram illustrating an example of a software configuration of a web service server apparatus according to an embodiment of the present invention.

The service server apparatus 10 according to an embodiment of the present invention may be implemented by functional (process) blocks illustrated in FIG. 6. FIG. 6 is a block diagram illustrating an example of a software configuration of the web service server apparatus 10 according to an embodiment of the present invention.

The web service server apparatus 10 includes a communication unit 20 and a web application 28. The web service server apparatus 10 implements an authentication unit 22, a static file management unit 24, and a user confidential information management unit 26 by executing the web application 28.

The communication unit 20 implements communication between the web service server apparatus 10 and the image forming apparatus 12 via the network N1. The web application 28 of the web service server apparatus 10 communicates with the image forming apparatus 12 via the communication unit 20.

The authentication unit 22 of the web application 28 performs authentication on the users that use the web service (user authentication). The user authentication may be performed by using a combination of user identification data (e.g., user ID) and confidential information (e.g., password). Further, the user authentication may be performed by using, for example, IC card information of a user having an IC card or biometric information of a user. The following embodiments are described with an example of a typical user authentication process using a combination of a user ID and a password.

When the authentication unit 22 completes the user authentication (normal completion), the authentication unit 22 transmits an authentication ticket in response to an access request from, so that the authentication ticket is used as proof of the user authentication. The authentication ticket may be, for example, a cookie managed by the below-described web browser 40. The static file management unit 24 manages files (web contents) for displaying a web page such as HTML, CSS (Cascading Style Sheet), or JavaScript (registered trademark).

The user confidential information management unit 26 manages data (personal information) that the user has retained in the web service. The personal information managed by the user confidential information management unit 26 can only be used (e.g., updated, read out) by the user who retains the personal information. For example, the user A cannot access the personal information of the user B.

In order for a user to use his/her own personal information, the user is required to have the authentication ticket. The user confidential information management unit 26 determines the user's validity by referring to the user ticket. Note that the authentication unit 22 inspects the validity of the authentication ticket.

The personal information managed by the user confidential information management unit 26 may include various information depending on the web service. For example, in a case where the web service is a shopping service, the personal information managed by the user confidential information management unit 26 may be credit card information (e.g., card number, validity date) or history information (e.g., purchase history, browsing history). In a case where the web service is a web mail service, the personal information managed by the user confidential information management unit 26 may be mailing information (e.g., transmission history, reception history). In a case where the web service is a translation service, the personal information managed by the user confidential information management unit 26 may be translation information (e.g., history of translated material).

<<Image Forming Apparatus>>

Figure 7:
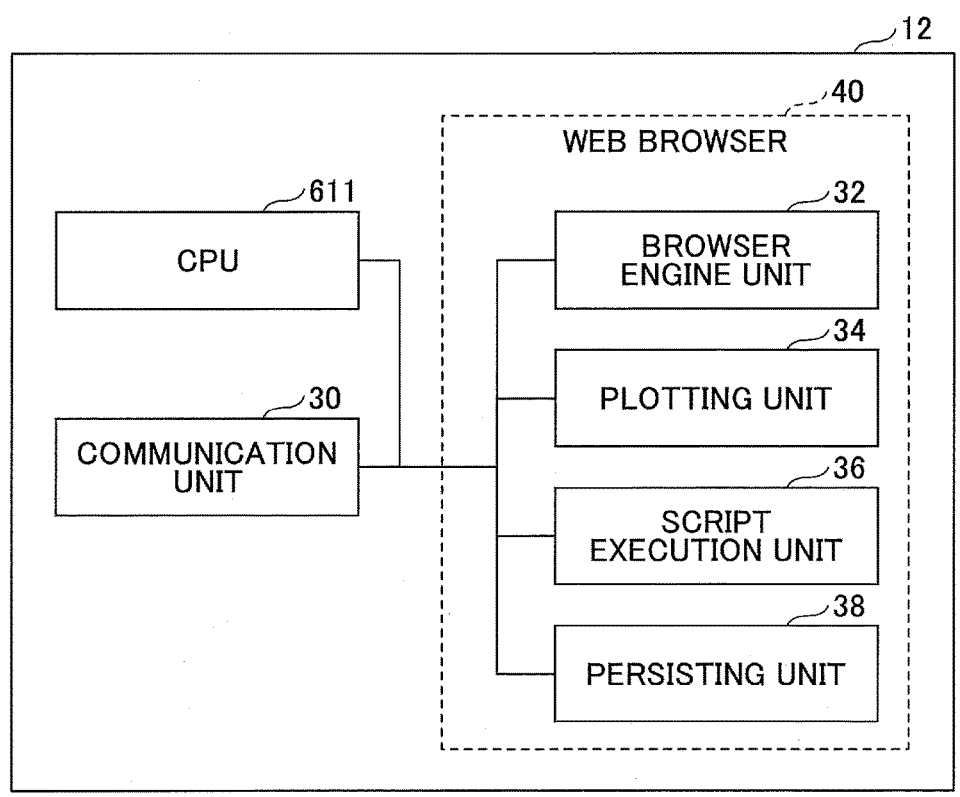
FIG. 7 is a functional block diagram illustrating an image forming apparatus according to an embodiment of the present invention.

The image forming apparatus 12 according to an embodiment of the present invention is implemented by a functional block configuration illustrated in FIG. 7. FIG. 7 is a functional block diagram illustrating the image forming apparatus 12 according to an embodiment of the present invention. Note that the blocks corresponding to functions specialized by the image forming apparatus 12 (e.g., printing function, scanning function) are not illustrated in FIG. 7.

The image forming apparatus 12 includes a communication unit 30 and a web browser 40. The image forming apparatus 12 implements a browser engine unit 32, a plotting unit 34, a script execution unit 26, and a persisting unit 38 by executing the web browser 40.

The communication unit 30 implements communication between the image forming apparatus 12 and the web service server apparatus 10 via the network N1. The web browser 40 of the image forming apparatus 12 communicates with the web service server apparatus 10 via the communication unit 30. That is, the web application 28 of the web service server apparatus 10 and the web browser 40 of the image forming apparatus 12 communicate with each other via the network N1.

A browser engine unit 32 of the web browser 40 obtains web contents such as HTML contents obtained by way of an HTTP request, CSS contents, and Javascript contents. The browser engine unit 32 analyzes the obtained web contents. Based on the analysis, the browser engine unit 32 provides plot information to the plotting unit 34, so that the plot information can be displayed by the plotting unit 34. The browser engine unit 32 also manages the operation of the entire web browser 40. The plotting unit 34 displays the plotting information such as a web page on the browser screen.

The script execution unit 36 executes a script (e.g., Javascript) added to the web contents obtained from the web service server apparatus 10. Note that the content of the script varies depending on the web service. For example, a script may include content that affects the plotting information or content that obtains a user's data (personal information) from the web service server apparatus 10.

Further, a script may also include an instruction to store the personal information obtained from the web service server apparatus 10 to the local storage (persisting area) of the web browser 40. A script may also include an instruction to obtain the personal information from the persisting area of the web browser 40. In response to an instruction to store personal information from the script execution part 36, the persisting unit 38 stores the personal information in the persisting area of the web browser 40.

For example, the persisting area of the web browser 40 allows the use of a function to store data on the side of the web browser 40 (web storage). In a case where a script includes an explicit instruction to delete personal information stored in the persisting area, the personal information is deleted. However, the personal information is not deleted even in a case where the power of the image forming apparatus 12 is switched off or where the web browser 40 is terminated.

Because the persisting area is shared among each of the origins of a web service that has obtained a script, there is a security risk that personal information of one user could be browsed by another user as illustrated in FIG. 2. As described above, such security risk is unlikely to occur in a case where the persisting area of the web browser 40 is provided on the side of a user's PC, because the persisting area of the web browser 40 is divided in correspondence with each user that is logged in to an operating system (OS) of the PC.

However, according to an embodiment of the present invention, when storing a user's personal information in the persisting area of the web browser 40, the script execution unit 36 encrypts the user's personal information by using a user-secret key obtained from the web service server apparatus 10. Further, when obtaining the user's personal information from the persisting area of the web browser 40, the script execution unit 36 decrypts the user's personal information by using the user-confidential key obtained from the web service server apparatus 10.

The personal information (user confidential information) of other users stored in the persisting area of the web browser 40 is encrypted by the user-confidential key. Therefore, a user cannot decrypt another user's personal information unless the user obtains the user-confidential key of the other user from the web service server apparatus 10. Further, a user cannot obtain the user-confidential key of the other user unless the user succeeds in user authentication by using the other user's ID or password. Therefore, with the data process system 1 according to an embodiment of the present invention, security can be improved by storing user confidential information in the persisting area of the web browser 40 by encrypting the user confidential information with a user-confidential key corresponding to each user.

Figure 8:
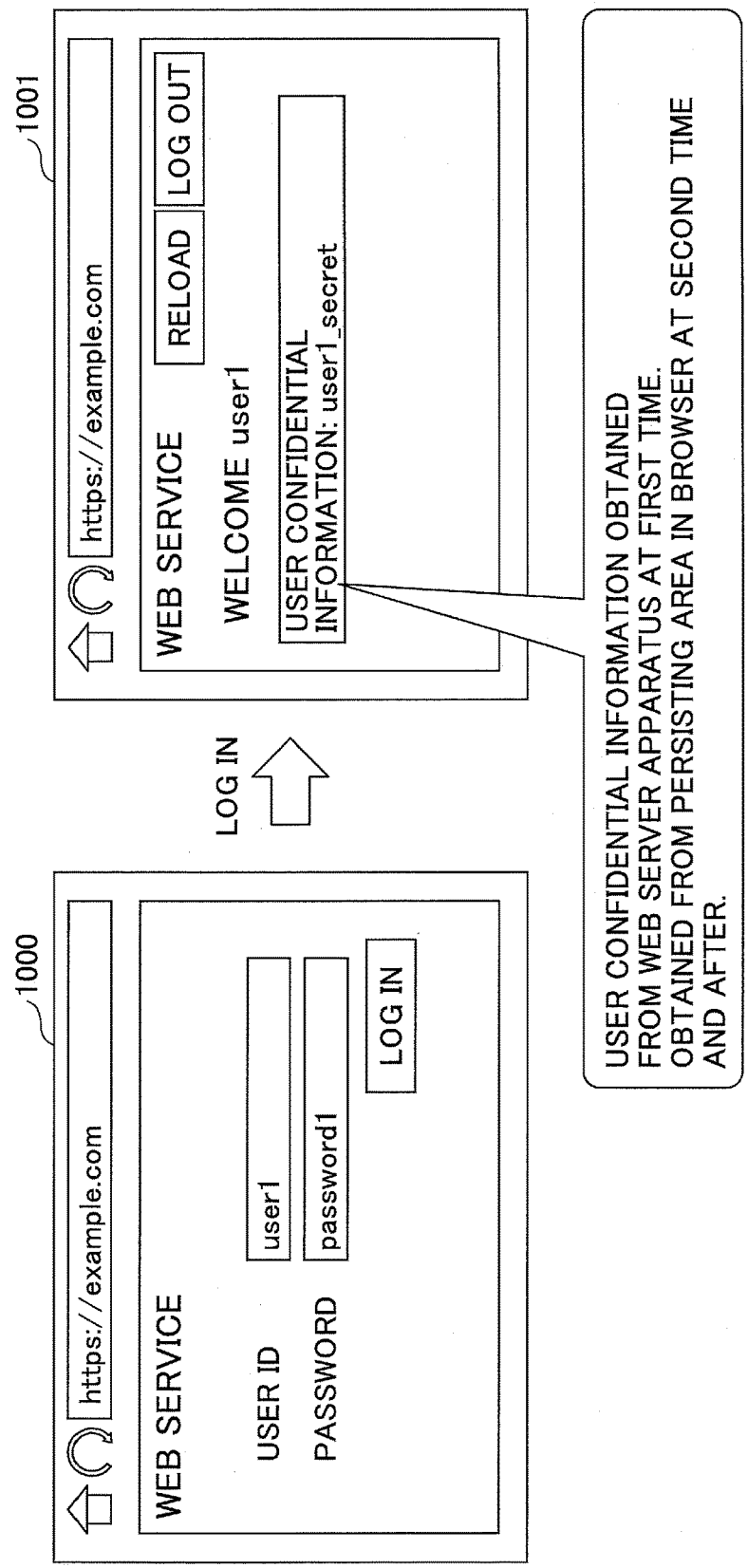
FIG. 8 is a schematic diagram for describing personal information displayed in a browser screen according to an embodiment of the present invention.

Note that the personal information stored in the persisting area of the web browser 40 may be displayed on a browser screen as illustrated in FIG. 8. FIG. 8 is a schematic diagram for describing personal information displayed in a browser screen 1000. The browser screen 1000 of FIG. 8 is an example of a log-in screen of a web service. A user can request logging in to the web service by inputting the user's ID and password in the browser screen 1000 displayed in the image forming apparatus 12.

When user authentication of the user is completed (normal completion), the image forming apparatus 12 obtains an authentication ticket from the web service server apparatus 10. Then, the image forming apparatus 12 uses the authentication ticket and displays the user's personal information such as user confidential information on a browser screen 1001. Other information displayed on the browser screen 1001 such as "web service" and "welcome user 1" are provided by the web application 28 of the web service server apparatus 10 in the form of an HTML file or a CSS file.

Note that the personal information displayed on the browser screen 1001 such as "user confidential information: user 1 secret" is obtained from the web application 28 of the web service server apparatus 10 in the form of a script.

Figure 20A:
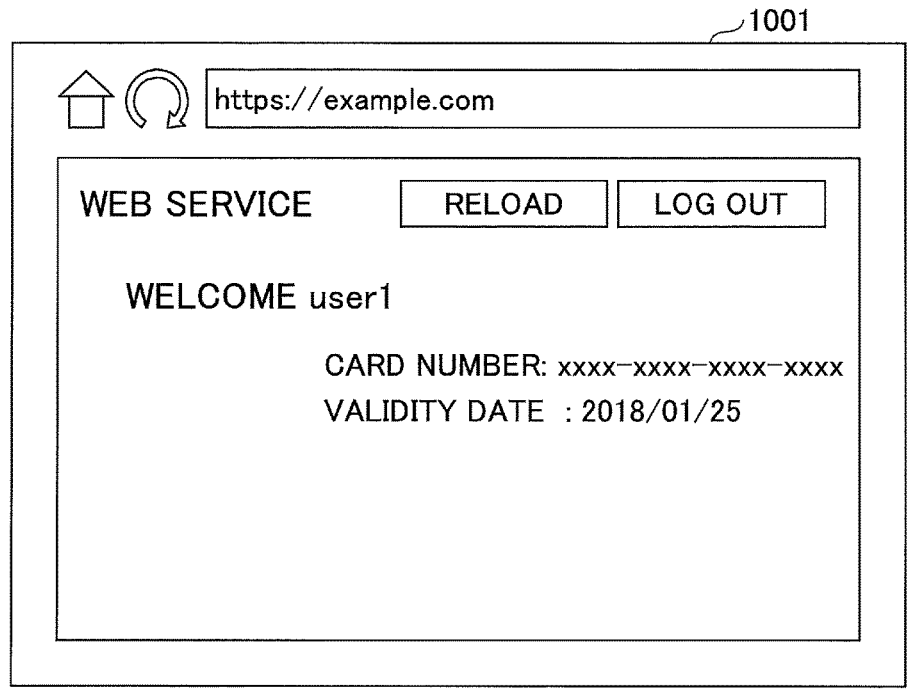
FIGS. 20A and 20B are schematic diagrams for describing specific examples of personal information displayed on a browser screen.
Figure 20B:
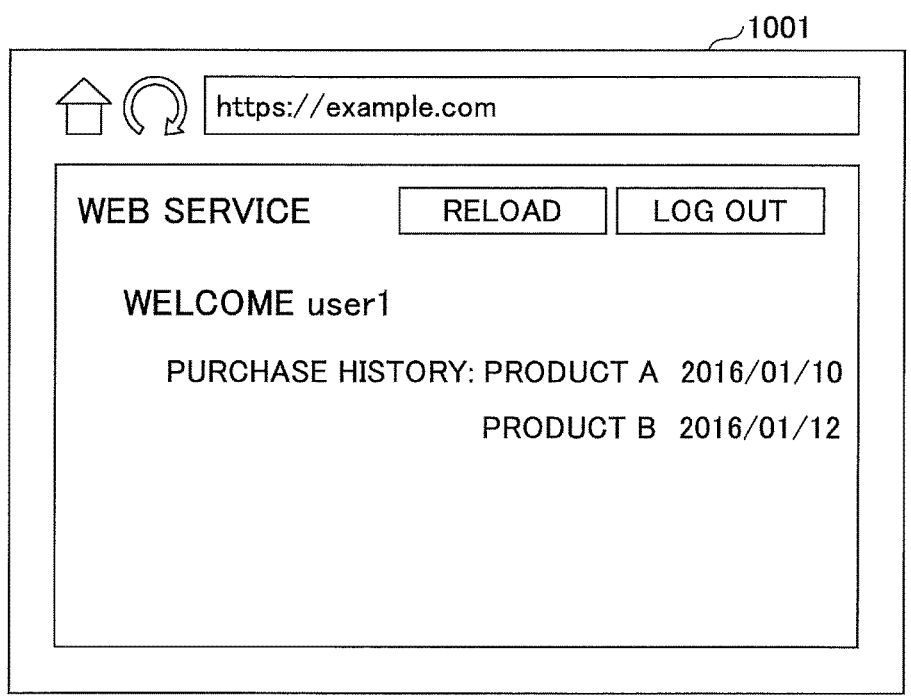

FIGS. 20A and 20B are schematic diagrams for describing specific examples of personal information displayed on a browser screen. FIG. 20A depicts an example of a browser screen 1001 in which credit card information is displayed as the personal information. In FIG. 20A, a card number and an validity date included in the credit card information is displayed on the browser screen 1001. FIG. 20B depicts an example of the browser screen 1001 in which history information is displayed as the personal information. In FIG. 20B, a purchase history included in the history information is displayed on the browser screen 1001.

In a case where personal information is stored in the persisting area of the web browser 40, a script obtains the personal information from the persisting area of the web browser 40. In a case where personal information is not stored in the persisting area of the web browser 40, a script obtains the personal information from the web service server apparatus 10.

<<Authentication Information Table>>

FIG. 9 is a schematic diagram illustrating an example of a user authentication information table that is retained in the authentication unit 22. The user authentication information table of FIG. 9 includes a user ID, a password, an authentication ticket, and a user secret key. The user ID is an example of user identification information for identifying a user. The password is an example of confidential information of a user. Note that FIG. 9 illustrates the password in the form of a plain text for the sake of convenience. The actual password is indicated in an encrypted state.

The authentication ticket is a ticket that is issued by the authentication unit 22 of the web service server apparatus 10 when user authentication is completed (normal completion). The authentication ticket is added to an HTTP response to the web browser 40 that has logged in to a web service. Thereby, the authentication ticket is transmitted (returned) from the web service server apparatus 10 to the web browser 40 of the image forming apparatus 12.

The user secret key is a secret key that is used when encrypting or decrypting user confidential information. The authentication unit 22 creates the secret key at the timing in which a user logs in to a web service. Note that the authentication ticket and the user secret key are discarded from the user authentication information table of FIG. 9 at the timing in which the user logs out from the web service.

The user authentication information table of FIG. 9 indicates that a user having a user ID "user 1" and a user having a user ID "user 2" are logged in whereas a user having a user ID "user 3" is not logged in.

Because the user having the user ID "user 3" is not logged in, the authentication ticket and the user secret key corresponding to the user ID "user 3" are indicated as "null" in the user authentication information table of FIG. 9 to represent that the authentication ticket and the user secret key corresponding to the user ID "user 3" are not recorded in the user authentication information table of FIG. 9.

<<User Confidential Information Table>>

FIG. 10 is a schematic diagram illustrating an example of a user confidential information table retained in the user confidential information management unit 26. The user confidential information table of FIG. 10 includes a user ID and user confidential information. As illustrated in FIG. 10, user confidential information is retained in the user confidential information table in association with a user ID. The user confidential information can be used by a user having a user ID associated to the user confidential information in the user confidential information table.

For example, in a case where the user having the user ID "user 1" desires to access his/her user confidential information, an authentication ticket obtained by user authentication is required. Therefore, the user having the user ID "user 1" can access the user confidential information of the user having the user ID "user 2" only if the user having the user ID "user 1" acquires the user ID and the password of the user having the user ID "user 2".

FIG. 11 is a schematic diagram illustrating an example of a user confidential information table that is retained in the persisting unit 38. The user confidential information table of FIG. 11 includes a user ID and encrypted user confidential information. The encrypted user confidential information is user confidential information that is encrypted with a user secret key obtained from the web application 28 of the web service server apparatus 10.

As illustrated in FIG. 11, encrypted user confidential information is stored in the user confidential information table in association with a user ID. The user secret key obtained from the web application 28 of the web service server apparatus 10 is also used for decrypting the encrypted user confidential information. Although this embodiment describes the use of a common key cryptography method in which the same key is used for encryption and decryption, a symmetric key cryptography method may be used.

<Detailed Process>

Next, processes of the data process system 1 according to an embodiment of the present invention are described in detail.

<<Process of Storing User Confidential Information in Persisting Area of Web Browser>>

Figure 12:
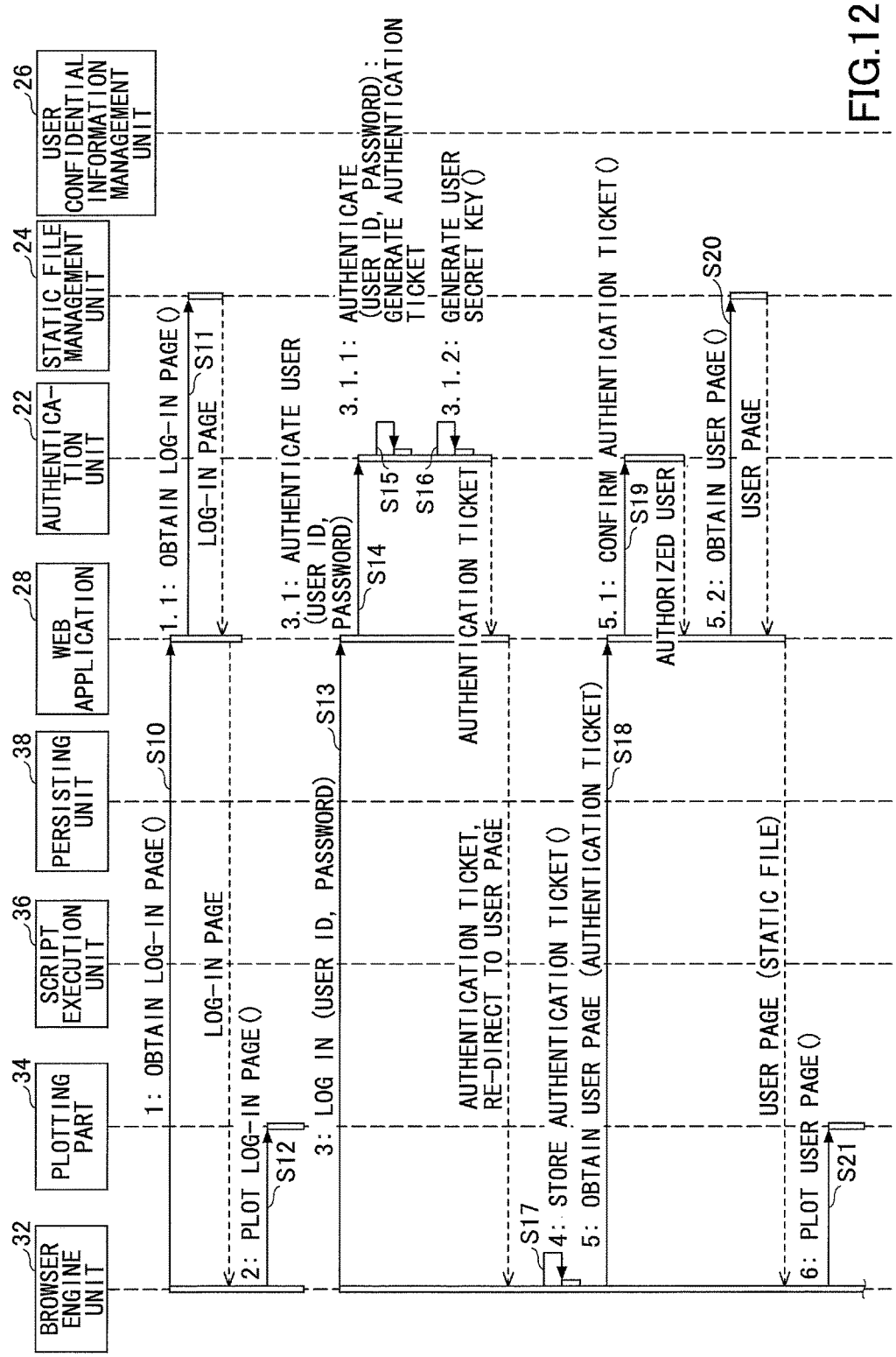
FIG. 12 is a sequence diagram illustrating a process in which a user logs in to a web service from a web browser of an image forming apparatus and continuing to a process in which information other than user confidential information is displayed on a user page of the image forming apparatus according to an embodiment of the present invention.

In the data process system 1 according to an embodiment of the present invention, user confidential information that is retained in the web service server apparatus 10 is stored in the persisting area of the web browser 40 by performing the processes illustrated in FIGS. 12 and 13.

FIG. 12 is a sequence diagram illustrating a process in which a user logs in to a web service from the web browser 40 of the image forming apparatus 12 and continuing to a process in which a user page precluding user confidential information is displayed on the image forming apparatus 12. FIG. 13 is a sequence diagram illustrating a process in which a user page including user confidential information (e.g., browser screen 1001 of FIG. 8) is displayed on the image forming apparatus 12 and continuing to a process in which user confidential information is stored in the persisting area of the web browser 40.

The processes of the sequence diagram of FIG. 12 start when a user operates on the web browser 40 of the image forming apparatus 12. In Step S10, the browser engine unit 32 of the web browser 40 requests the web application 28 of the web service server application 10 to obtain a log-in page.

In Step S11, the web application 28 obtains web contents of the log-in page from the static file management unit 24 and sends the web contents of the log-in page to the browser engine part 32 of the image forming apparatus 12. The method for obtaining the web contents of the log-in page may be performed by using a typical HTTP request.

In Step S12, the browser engine unit 32 analyzes the web contents (e.g., HTML, CSS) returned from the web service server apparatus 10 and creates plotting information according to the analysis. The browser engine unit 32 provides the created plotting information to the plotting unit 34 and requests the plotting unit 34 to plot a log-in page. The plotting unit 34 plots a log-in page based on the provided plotting information and displays the log-in page on a browser screen (e.g., browser screen 1000 of FIG. 8).

The user enters a user ID and a password into the log-in page and presses a log-in button. In Step S13, the browser engine unit 32 of the image forming apparatus 12 sends a request added with the user ID and the password to the web service server apparatus 10 to request log-in to the web application 28 of the web service server apparatus 10.

In Step S14, the web application 28 requests the authentication unit 22 to authenticate the user ID and the password. In Step S15, the authentication unit 22 refers to the user authentication information table of FIG. 9 and inspects the validity (authenticity) of the user ID and the password. In a case where the authentication unit 22 determines that the user ID and the password are valid, the authentication unit 22 determines that user authentication is a success. When the user authentication succeeds, the authentication unit 22 creates an authentication ticket.

Further, when the user authentication succeeds, the authentication unit 22 creates a user secret key in Step S16. Further, the authentication unit 22 stores the successfully authenticated user ID and password (success of user authentication) into the user authentication information table of FIG. 9. The user ID and the password are stored in a manner in which the user ID and the password are associated with the authentication ticket and the user secret key by the authentication unit 22.

The web application 28 adds the authentication ticket to an HTTP response header and sends the authentication ticket to the web browser 40 of the image forming apparatus 12 in response to the HTTP request. Further, the web application 28 instructs the web browser 40 of the image forming apparatus 12 to re-direct to a user page URL as an HTTP response.

In Step S17, the browser engine unit 32 stores the authentication ticket sent from the web application 28 of the web service server apparatus 10 in a cookie storage space of the web browser 40. The process of storing the authentication ticket in the cookie storage space of the web browser 40 is a typical action that is performed by the web browser 40.

In Step S18, the browser engine unit 32 executes a process of re-directing to the user page URL instructed by the web application 28. More specifically, the browser engine unit 32 requests the web application 28 of the web service server application 10 to obtain a user page that is added to the authentication ticket.

In Step S19, the web application 28 requests the authentication unit 22 to confirm the authentication ticket. The authentication unit 22 refers to the user authentication information table of FIG. 9 and determines that the user corresponding to the authentication ticket (i.e., authentication ticket requested to be confirmed) is a valid user if the authentication ticket exists in the user authentication information table. The example of FIG. 12 illustrates the case where the user is determined to be a valid user. Then, the authentication unit 22 sends the determination result to the web application 28.

Based on the determination result indicating that the user is valid, the web application 28 obtains web contents of the user page from the static file management unit 24 and sends (returns) the web contents of the user page to the browser engine unit 32 of the image forming apparatus 12. The web application 28 does not send the web contents of the user page to the browser engine unit 32 of the image forming apparatus 12 in a case where the user is not determined as a valid user.

In Step S21, the browser engine unit 32 analyzes the web contents (e.g., HTML contents, CSS contents) sent from the web service server apparatus 10 and creates plotting information. The browser engine unit 32 provides the created plotting information to the plotting unit 34 and requests the plotting unit 34 to plot the user page. The plotting unit 34 plots the user page based on the plotting information and displays the user page on the browser screen.

Further, the browser engine unit 32 performs a process of Step S31 of FIG. 13 in parallel with the process of Step S21. That is, the browser engine unit 32 instructs the script execution unit 36 to execute a Javascript script included in the web contents sent from the web service server apparatus 10 in Step S31. The user ID and the authentication ticket are added to the instruction sent from the browser engine unit 32 to the script execution unit 36. Further, the Javascript script instructed to be executed in Step S31 is a script to plot the user confidential information in the user page.

In Step S32, the script execution unit 36 requests the web application 28 of the web service server apparatus 10 to obtain a user secret key corresponding to the authentication ticket. In Step S33, the web application 28 requests the authentication unit 22 to obtain the user secret key corresponding to the authentication ticket. Then, the authentication unit 22 refers to the user authentication information table of FIG. 9 and sends the user secret key corresponding to the authentication ticket to the web application 28.

Then, the web application 28 sends the user secret key corresponding to the authentication ticket to the script execution unit 36 of the image forming apparatus 12. In Step S34, the script execution unit 36 attempts to obtain the user confidential information from the persisting area of the web browser 40 as follows. In Step S35, the script execution unit 36 designates a user ID corresponding to the user confidential information and requests the persisting unit 38 to obtain the encrypted user confidential information of FIG. 11. In this example, it is assumed that the encrypted user confidential information is not stored in the persisting area of the web browser 40.

Then, the script execution unit 36 proceeds to the process of Step S36 when the script execution unit 36 receives a response indicating that the encrypted user confidential information is not stored in the persisting area. In Step S36, the script execution unit 36 requests the web application 28 of the web service server application 10 to obtain the user confidential information corresponding to the authentication ticket.

In Step S37, the web application 28 requests the authentication unit 22 to confirm the authentication ticket. The authentication unit 22 refers to the user authentication information table of FIG. 9 and determines that the user corresponding to the authentication ticket is a valid user if the user ticket exists in the user authentication information table. The example of FIG. 13 illustrates a case where the user is determined to be a valid user. Then, the authentication unit 22 sends the determination result to the web application 28.

Based on the determination result indicating that the user is valid, the web application 28 obtains the user confidential information from the user confidential information management unit 26 and sends (returns) the user confidential information to the script execution unit 36 of the image forming apparatus 12. Note that the web application 28 does not send the user confidential information to the script execution unit 36 of the image forming apparatus 12 in a case where the user is not determined as a valid user.

In Step S39, the script execution unit 36 encrypts the user confidential information by using the user secret key. The method for encrypting the user confidential information may be, for example, a common key cryptography method such as DES (Data Encryption Standard) or AES (Advanced Encryption Standard).

In Step S39, the script execution unit 36 requests the persisting unit 38 to store the encrypted user confidential information in the persisting area of the web browser 40. Accordingly, the persisting area 38 stores the encrypted user confidential information in the persisting area of the web browser 40 in a manner illustrated in a user confidential information table of FIG. 11. That is, the encrypted user confidential information is stored in a key-value format in which the user ID is a key and the encrypted user confidential information is a value corresponding to the key.

In Step S41, the script execution unit 36 requests the plotting unit 34 to plot the user confidential information sent from the web service server apparatus 10. Then, the plotting unit 34 plots the requested user confidential information in the user page.

<<Process of Using User Confidential Information Stored in Persisting Area of Web Browser>>

Figure 14:
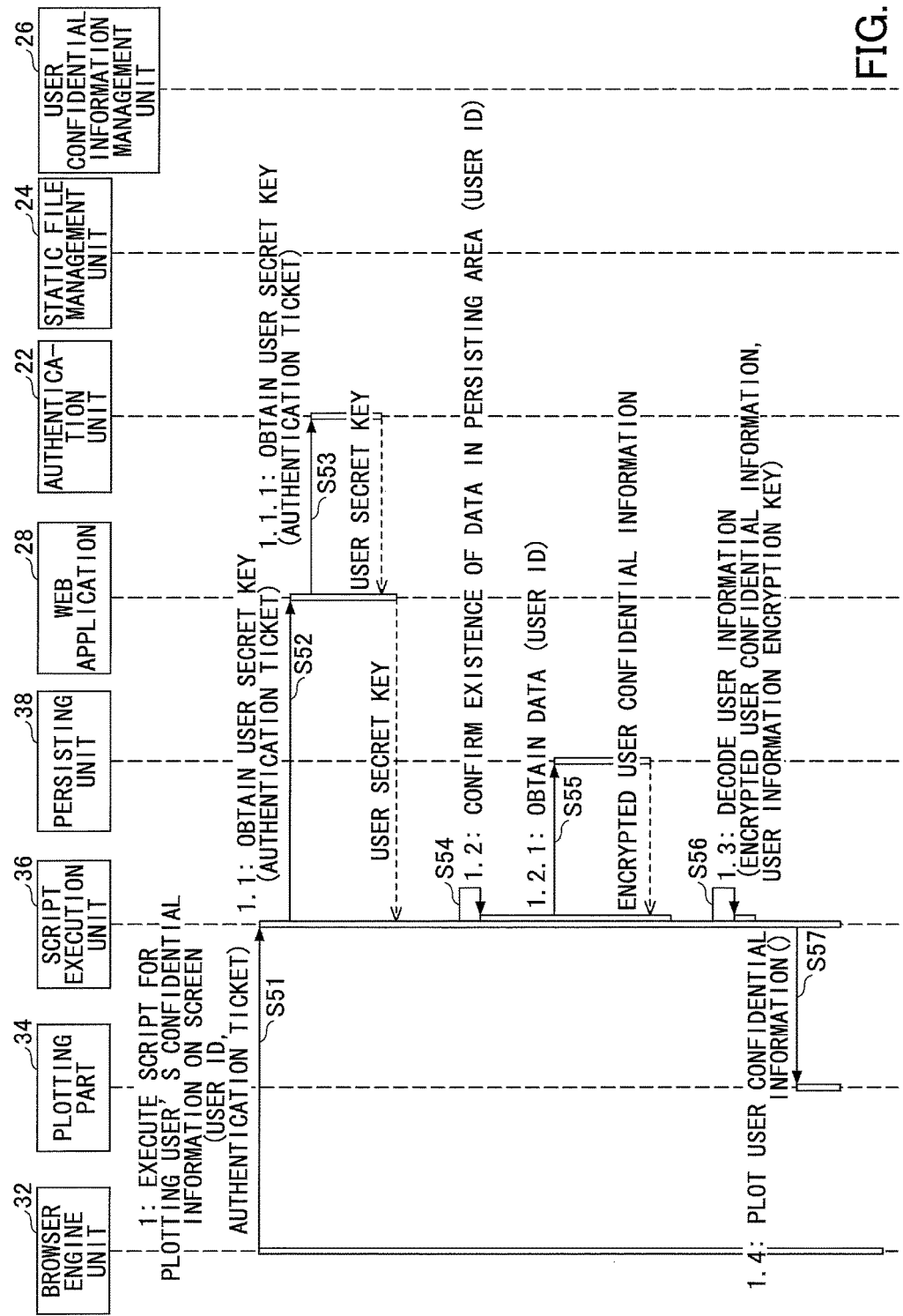
FIG. 14 is a sequence diagram illustrating the processes in which encrypted user confidential information that is stored in a persisting area of a web browser is decrypted and used.

In the data process system 1 according to an embodiment of the present invention, encrypted user confidential information that is stored in the persisting area of the web browser 40 is decrypted and used by the processes illustrated in FIG. 14. FIG. 14 is a sequence diagram illustrating the processes in which encrypted user confidential information that is stored in the persisting area of the web browser 40 is decrypted and used.

In the example illustrated in FIG. 14, a user that previously used a web service by the processes of FIGS. 12 and 13 is assumed to use the web service again. Note that information other than user confidential information is displayed in the user page by the processes illustrated in FIG. 12 before the processes of FIG. 14 are executed.

In Step S51, the browser engine unit 32 instructs the script execution unit 36 to execute a Javascript script included in the web contents sent (returned) from the web service server apparatus 10. A user ID and an authentication ticket are added to the instruction of Step S51. Further, the Javascript script instructed to be executed in Step S51 is a script to plot the user confidential information in the user page.

In Step S52, the script execution unit 36 requests the web application 28 of the web service server apparatus 10 to obtain a user secret key corresponding to the authentication ticket. In Step S53, the web application 28 requests the authentication unit 22 to obtain the user secret key corresponding to the authentication ticket. Then, the authentication unit 22 refers to the user authentication information table of FIG. 9 and sends the user secret key corresponding to the authentication ticket to the web application 28.

Then, the web application 28 sends the user secret key corresponding to the authentication ticket to the script execution unit 36 of the image forming apparatus 12. In Step S54, the script execution unit 36 attempts to obtain the user confidential information from the persisting area of the web browser 40 as follows. In Step S55, the script execution unit 36 designates a user ID corresponding to the user confidential information and requests the persisting unit 38 to obtain the encrypted user confidential information of FIG. 11.

In this example, it is assumed that the encrypted user confidential information is stored in the persisting area of the web browser 40. Then, the persisting unit 38 uses the user ID as a key and obtains the encrypted user confidential information of a value corresponding to the key from the user confidential information table of FIG. 11.

In Step S56, the script execution unit 36 decrypts the encrypted user confidential information by using the user secret key. In Step S57, the script execution unit 36 requests the plotting unit 34 to plot the decrypted user confidential information. Then, the plotting unit 34 plots the requested user confidential information in the user page.

<<Process of Obtaining User Confidential Information by Script Execution Unit>>

Figure 15:
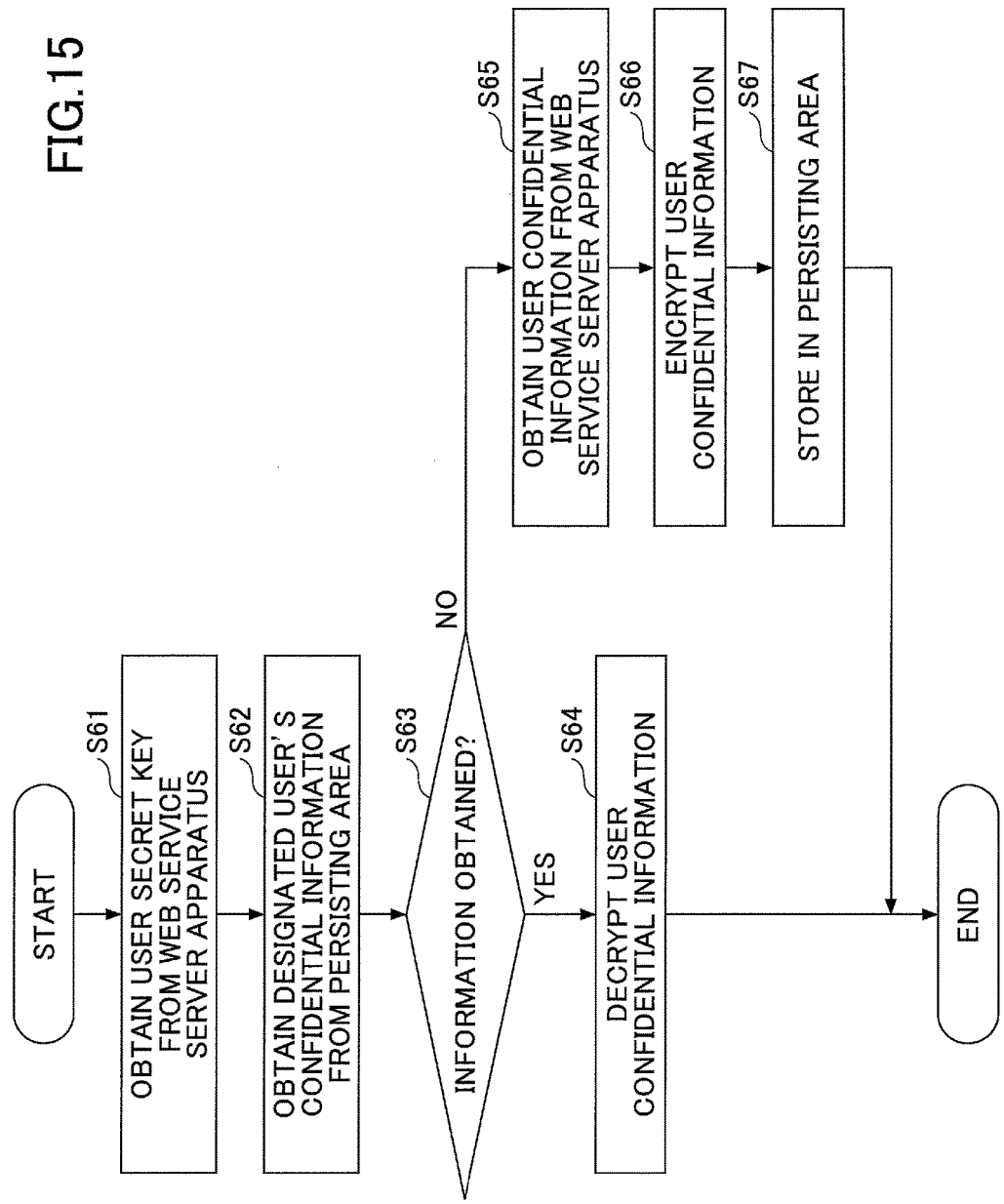
FIG. 15 is a flowchart illustrating a process of obtaining user confidential information by way of a script execution unit according to an embodiment of the present invention.

FIG. 15 is a flowchart illustrating a process of obtaining user confidential information by way of the script execution unit 36. In Step S61, the script execution unit 36 obtains a user secret key from the web application 28 of the web service server apparatus 10.

In Step S62, the script execution unit 36 designates a user ID corresponding to the user confidential information and requests the persisting unit 38 to obtain the encrypted user confidential information of FIG. 11. In a case where the script execution unit 36 can obtain the encrypted user confidential information (Yes in Step S63), the script execution unit 36 decrypts the encrypted user confidential information by using the user secret key in Step S64.

In a case where the script execution unit 36 cannot obtain the encrypted user confidential information (No in Step S63), the script execution unit 36 proceeds to the process of Step S65. In Step S65, the script execution unit 36 obtains the user confidential information from the web service server apparatus 10. In Step S66, the script execution unit 36 encrypts the user confidential information by using the user secret key.

In Step S67, the script execution unit 38 requests the persisting unit 38 to store the encrypted user confidential information in the persisting area of the web browser 40. Accordingly, the persisting unit 38 stores the encrypted user confidential information in the persisting area of the web browser 40.

Hence, with the data process system 1 according to the above-described embodiment of the present invention, the script execution unit 36 encrypts the user confidential information with the user secret key obtained from the web service server apparatus 10 in a case of storing the user confidential information in the persisting area of the web browser 40. Further, with the data process system 1 according to the above-described embodiment of the present invention, the script execution unit 36 decrypts the user confidential information by using the user secret key obtained from the web service server apparatus 10 in a case of obtaining the user confidential information from the persisting area of the web browser 40.

Accordingly, even in a case where a web service of the web browser 40 of the image forming apparatus 12 is used by other users, the user can also use the web service but cannot decrypt and browse the encrypted user confidential information of the other users stored in the persisting area of the web browser 40. For example, in a case of using a web browser 40 that operates on a shared device (e.g., image forming apparatus 12) in the data process system 1, information being stored in a web service and requiring user authentication can be encrypted and stored in the persisting area of the web browser 40.

For example, in a case of a web browser that operates in an electronic device (e.g., image forming apparatus) shared by multiple users (shared device), a web browser has data storage space for the users in which most of the data storage space is not divided in correspondence with each user logged-in to the shared device. The data storage space of the web browser is not divided in such manner because each user logs in to the shared device. Thus, unlike the logging-in to a typical OS, it is difficult to divide the data storage area of the web browser shared by each logged-in user at the OS level. Although a specific OS dedicated to the image forming apparatus 12 may be installed in the image forming apparatus 12, so that the data storage area of the web browser 40 can be divided in correspondence with each user sharing the image forming apparatus 12, the installation of the specific OS is laborious.

However, with the data process apparatus 1 according to an embodiment of the present invention, the information stored in the data storage area of the web browser 40 is encrypted, so that the security of information stored in the data storage area of the web browser 40 can be improved without having to divide the data storage area of the web browser 40 in correspondence with each logged-in user.

Hence, with the data process system 1 according to the above-described embodiment of the present invention, the security of the information stored in the persisting area of the web browser 40 operating in the image forming apparatus 12 can be improved.

Second Embodiment

According to the first embodiment, a user secret key is used for obtaining user confidential information from the persisting area of the web browser 40. In the following second embodiment, the number of times of communication can be reduced by storing the user secret key obtained from the web service server apparatus 10 in a volatile storage area of the web browser 40. Note that like parts and components described in the second embodiment are denoted with like reference numerals as the reference numerals of the first embodiment and are not described in further detail.

For example, the volatile area of the web browser 40 allows a session storage to be used for storing data on the side of the web browser 40 (also referred to as "web storage"). The session storage is a storage that is valid during a session corresponding to each window of the web browser 40. The session storage stores data during a period in which a window or a tab is open. The session storage deletes the stored data when the window or tab is closed.

Note that the persisting area of the web browser 40 can use a local storage that stores data on the side of the web browser 40 (also referred to as "web storage"). The local storage is a storage that persistently stores data of a user using the web browser 40.

<Software Configuration>
<<Image Forming Apparatus>>

Figure 16:
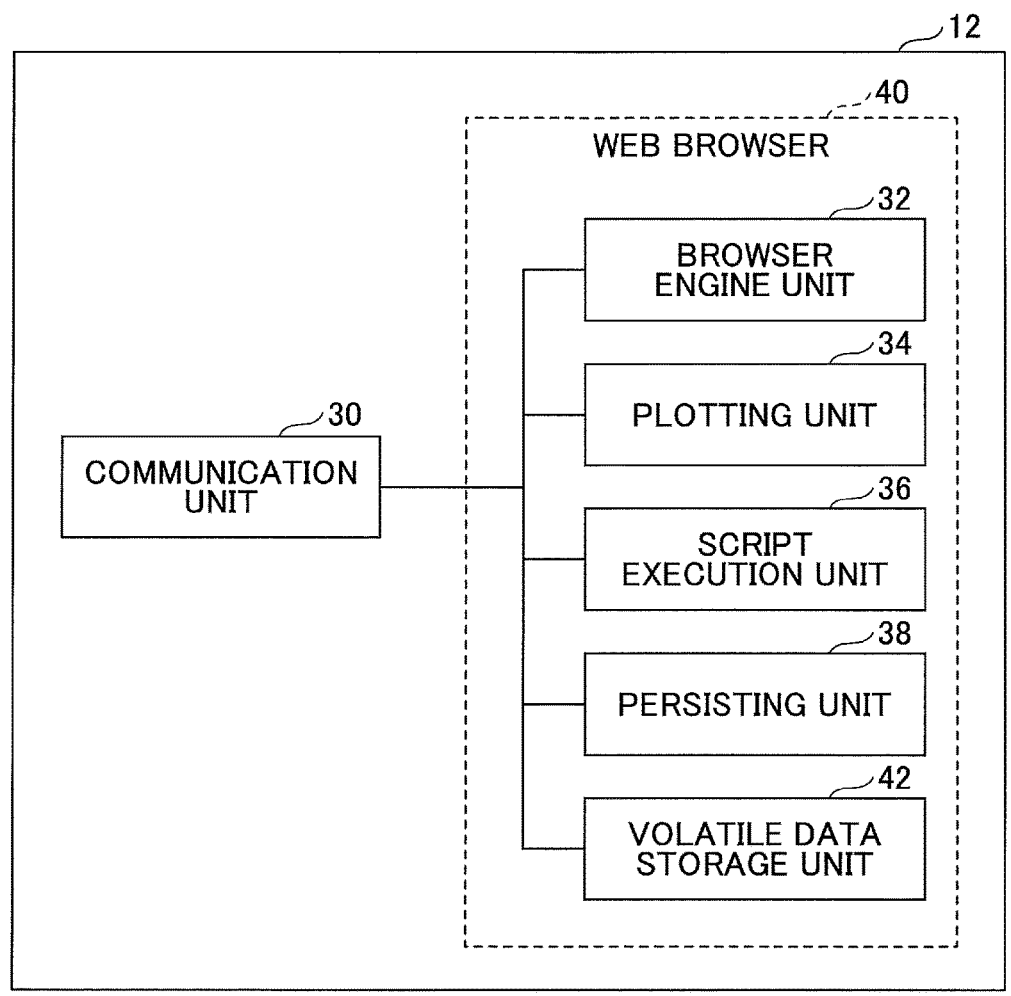
FIG. 16 is a functional block diagram illustrating an image forming apparatus according to an embodiment of the present invention.

The image forming apparatus 12 according to another embodiment of the present invention may be implemented by functional (process) blocks illustrated in FIG. 16. FIG. 16 is a functional block diagram illustrating the image forming apparatus 12 according to another embodiment of the present invention.

The image forming apparatus 12 of FIG. 16 has substantially the same configuration as the image forming apparatus 12 of FIG. 7 except that a volatile data storage unit 42 is added to the web browser 40. The volatile data storage unit 42 includes a volatile area and stores (retains) data in the volatile area.

<Detailed Process>

Next, processes of the data process system 1 according to the second embodiment of the present invention are described in detail.

Figure 17:
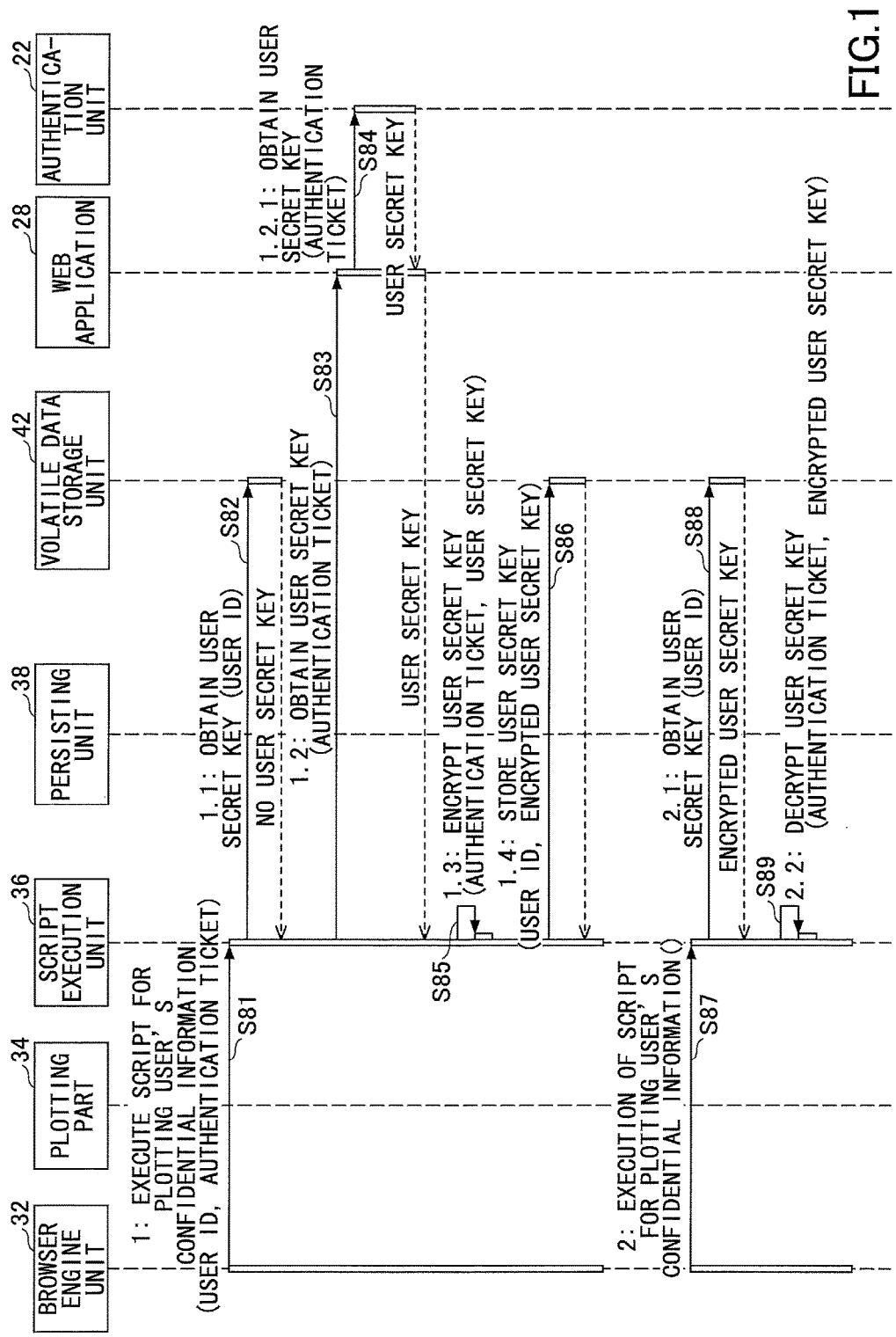
FIG. 17 is a sequence diagram illustrating the processes in which a user secret key is stored in a volatile area of a web browser according to an embodiment of the present invention.

In the data process system 1 of the second embodiment, a user secret key is stored in the volatile area of the web browser 40 according to the processes illustrated in FIG. 17. FIG. 17 is a sequence diagram illustrating the processes in which the user secret key is stored in the volatile area of the web browser 40. Note that information other than user confidential information is displayed in the user page by the processes of FIG. 12 before the processes of FIG. 17 are executed.

In Step S81, the browser engine unit 32 instructs the script execution unit 36 to execute a Javascript included in the web contents sent from the web service server apparatus 10. A user ID and an authentication ticket are added to the instruction of Step S51. Further, the Javascript instructed to be executed is a script to plot the user confidential information in the user page.

In Step S82, the script execution unit 36 designates a user ID and requests the volatile data storage unit 42 to obtain a user secret key corresponding to the user ID. In this example, it is assumed that the user secret key is not stored in the volatile area of the web browser 40.

Then, the script execution unit 36 proceeds to the process of Step S83 when the script execution unit 36 receives a response indicating that the user secret key is not stored in the volatile area of the web browser 40. In Step S83, the script execution unit 36 requests the web application 28 of the web service server application 10 to obtain the user secret key corresponding to the authentication ticket. In Step S84, the web application 28 requests the authentication unit 22 to obtain the user secret key corresponding to the user ticket. The authentication unit 22 refers to the user authentication information table of FIG. 9, obtains the user secret key corresponding to the authentication ticket, and sends the user secret key to the web application 28.

The web application 28 sends (returns) the user secret key corresponding to the authentication ticket to the script execution unit 36 of the image forming apparatus 12. In Step S85, the script execution unit 36 encrypts the user secret key by using the authentication ticket as an encrypting key according to the common key cryptography method. In Step S86, the script execution unit 36 requests the volatile data storage unit 42 to store the encrypted user secret key in the volatile area of the web browser 40. The volatile data storage unit 42 stores the encrypted user secret key in the volatile area of the web browser 40 by using a key-value format in which the user ID is a key and the encrypted user secret key is a value corresponding to the key.

Although the processes of Steps S34 to S41 of FIG. 13 or the processes of Steps S54 to S57 of FIG. 14 are executed after the execution of the process of Step S86, further explanation of the processes of Steps S34 to S41 of FIG. 13 and the processes of Steps S54 to S57 of FIG. 14 is omitted. The below-described processes of Step S87 and after are executed in a case where the user secret key is stored in the volatile area of the web browser 40.

In Step S87, the browser engine unit 32 instructs the script execution unit 36 to execute a Javascript included in the web contents sent from the web service server apparatus 10. The Javascript instructed to be executed in Step S87 is a script to plot the user confidential information in the user page.

In Step S88, the script execution unit 36 designates the user ID and requests the volatile data storage unit 42 to obtain the user secret key corresponding to the user ID. Then, the volatile data storage unit 42 uses the user ID as a key and obtains the encrypted user secret key of a value corresponding to the key from the user confidential information table of FIG. 11. In Step S89, the script execution unit 36 decrypts the encrypted user secret key by using the authentication ticket.

Although the processes of Steps S34 to S41 of FIG. 13 or the processes of Steps S54 to S57 of FIG. 14 are executed after the execution of the process of Step S89, further explanation of the processes of Steps S34 to S41 of FIG. 13 and the processes of Steps S54 to S57 of FIG. 14 is omitted.

According to the second embodiment, the user secret key is stored in the volatile area of the web browser 40 after the user secret key is encrypted by the authentication ticket. By encrypting the user secret key with the authentication ticket, the user using the web browser 40 cannot decrypt the encrypted user secret key when the validity of the authentication ticket expires.

Therefore, with the second embodiment of the present invention, the period in which the user secret key is stored in the volatile area of the web browser 40 becomes equal to the period in which the web browser 40 is logged in to the web service (period in which the authentication ticket is retained). Thus, according to the second embodiment, the use of the user secret key with an expired authentication ticket can be prevented. Thereby, security of the shared device can be improved.

Third Embodiment

Figure 18:
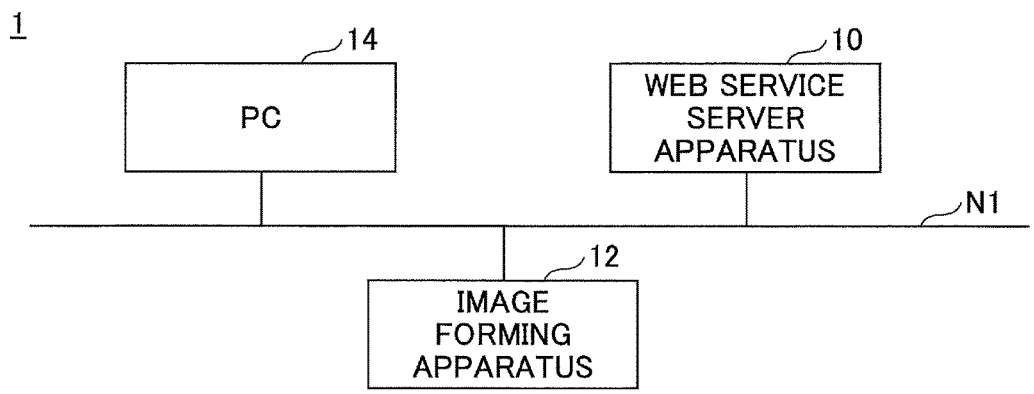
FIG. 18 is a schematic diagram illustrating a data process system according to another embodiment of the present invention.

In the first and second embodiments, the data process system 1 includes the web service server apparatus 10 and the image forming apparatus 12 as illustrated in FIG. 3. In the following third embodiment illustrated in FIG. 18, a PC (Personal Computer) 14 is added to the data process system 1 of FIG. 3.

The web browser 40 that operates in the PC 14 often have a data storage area which is divided in correspondence with each user logged in to the OS of the PC 14, and the persisting area of the web browser 40 is also divided into each user. Therefore, in a case of storing user confidential information stored in the web service server apparatus 10 into the persisting area of the web browser 40 operating in the PC 14, a Javascript script for plotting the user confidential information in the user page need not be transmitted to the PC 14.

Therefore, according to the third embodiment, the web service server apparatus 10 determines whether the source requesting to obtain the user page is the image forming apparatus (shared device) 12 or the PC 14. In a case where the request to obtain the user page originates from the image forming apparatus 12, the web service server apparatus 10 transmits a Javascript script to plot the user confidential information in the user page. Whether a request originates from the image forming apparatus 12 or the PC 14 may be determined by referring to, for example, the header of the request from the web browser 40. Typically, in a case where a request is transmitted from the web browser 40, a header "User-Agent" indicating the source of the request is added to the request. Therefore, the web service server apparatus 10 can determine whether the source of the request is the image forming apparatus 12 or the PC 14 by referring to the header "User-Agent".

Figure 19:
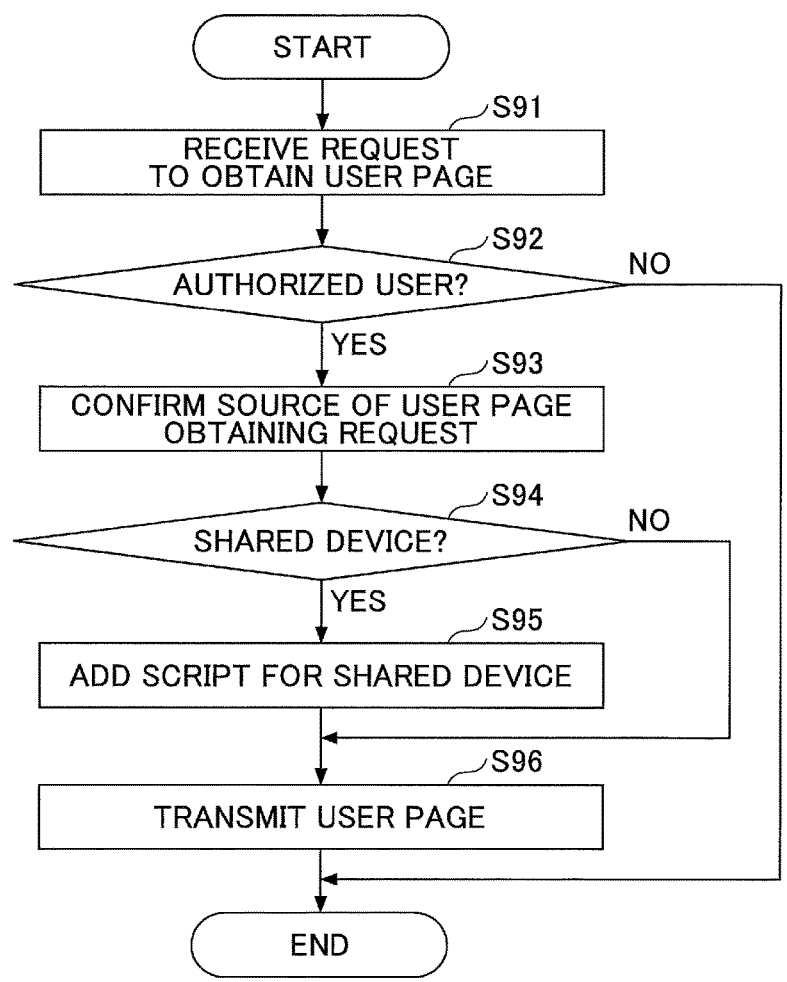
FIG. 19 is a flowchart illustrating a process of a web application receiving a request to obtain a user page according to an embodiment of the present invention.

FIG. 19 is a flowchart illustrating a process of the web application 28 receiving a request to obtain a user page according to an embodiment of the present invention. In Step S91, the web application 28 receives a request to obtain a user page.

In Step S92, the web application 28 requests the authentication unit 22 to confirm the authentication ticket to determine whether the user is a valid user. In a case where the user is a valid user (Yes in Step S92), the web application 28 determines the source of the request to obtain the user page (Step S93). In a case where the source of the request to obtain the user page is the image forming apparatus (shared device) 12 (Yes in Step S94), the web application 28 proceeds to Step S95. In Step S95, the web application 28 adds the web contents of the user page to a Javascript instruction to plot the user confidential information on the user page. In Step S96, the web application 28 sends the Javascript added with the web contents to the image forming apparatus 12.

Note that the web application 28 terminates the process illustrated in FIG. 19 in a case where the user is determined as an invalid user (No in Step S92). Further, the web application 28 skips the process of Step S95 and proceeds to the process of Step S96 in a case where the source requesting to obtain the user page is not a shared device (image forming apparatus 12) (No in Step S94).

In a case where the web application 28 skips the process of Step S95, the web application 28 does not add a Javascript instruction to plot the user confidential information in the user page to the web contents of the user page and sends the web contents of the user page without the Javascript to the image forming apparatus 12.

Hence, with the third embodiment, web contents of a user page added with a Javascript instruction to plot user confidential information in the user page can be sent to the image forming apparatus (shared device) 12 in a case where the image forming apparatus (shared device) 12 is the source requesting to obtain the user page.

The present invention is not limited to the specifically disclosed embodiments, and variations and modifications may be made without departing from the scope of the present invention.

Javascript is an example of a function addition program described in the claims.

The persisting area of the web browser 40 is an example of the persisting data storage area described in the claims. The volatile area is an example of a volatile data storage area of a browser. The authentication ticket is an example of authentication information indicating that a user is authenticated.

The present application is based on and claims the benefit of priority Japanese Patent Priority Application Nos. 2015-114216 and 2016-022201 filed on Jun. 4, 2015 and Feb. 8, 2016, respectively, with the Japanese Patent Office, the entire contents of which are hereby incorporated by reference.

What is claimed is:

1. A data process system comprising:
a shared device that is shared by a plurality of users, the shared device including a browser that allows each of the plurality of users to access a web service; and
a data process apparatus that provides contents to be displayed on the browser;
wherein the data process apparatus includes a first processor that executes a process including authenticating a user of the plurality of users that operates the shared device,
providing an encryption key that is unique to each authenticated user to the shared device, and
providing a function-adding program to the shared device, the function-adding program configured to add a function to the browser,
wherein the shared device includes a second processor that causes the browser to execute a process including
executing, by the shared device, the function-adding program to encrypt data by using the encryption key that is unique to the each authenticated user in a case of storing the data in a storage area, and
executing the function-adding program to decrypt the encrypted data by using the encryption key that is unique to the each authenticated user in case of obtaining the data in a storage area,
wherein in a case where the authentication of the user succeeds, the authenticating includes generating authentication data indicating that the encryption key and the user are valid,
providing the authentication data to the shared device,
managing the encryption key and the authentication data in association with the authenticated user, and
providing the encryption key associated to the authentication data in a case where the data process apparatus receives a request to obtain the encryption key added with the authentication data from the shared device.

2. The data process system as claimed in claim 1, wherein the storage area includes a persisting storage area that persistently retains the data,
wherein in a case where the encrypted data is stored in the persisting storage area, the second processor causes the browser to decrypt the encrypted data by using the encryption key and display the decrypted data,
wherein in a case where the encrypted data is not stored in the persisting storage area, the second processor causes the browser to obtain user data associated with the authenticated user, display the user data, encrypt the user data and store the encrypted user data in the persisting storage area.

3. The data process system as claimed in claim 1, wherein the storage area includes a volatile storage area that retains the data in a volatile manner,
wherein in a case where the encryption key is stored in the volatile storage area, the executing of the function-added program includes decrypting the authentication data by using the encryption key and using the decrypted authentication data, and
wherein in a case where the encryption key is not stored in the volatile storage area, the executing of the function-added program includes using the encryption key associated to the authenticated user, encrypting the authentication data with the encryption key, and storing the authentication data in the volatile storage area.

4. The data process system as claimed in claim 1, wherein the providing of the function-added program includes determining whether a device is the shared device that includes the browser having the storage area shared by the plurality of users or a device that includes a browser having a storage area that is divided in correspondence with each of the plurality of users, and providing the function-added program to the shared device in the case where the determined device is the shared device.

5. The data process system as claimed in claim 1, wherein the browser includes a storage area that cannot divided in correspondence with each of the plurality of users.

6. The data process system as claimed in claim 1, wherein the first processor executes the process including providing the function-adding program to the shared device along with user ID of the user and an authentication ticket that is produced by the data process apparatus when the user is authenticated.

7. The data process system as claimed in claim 1, wherein encryption and decryption are performed by the same function-adding program and the same encryption key that are provided by the data process apparatus.

8. The data process system as claimed in claim 1, wherein the data process apparatus has a user authentication information table including a user ID of the each authenticated user and the encryption key that is unique to the each authenticated user.

9. The data process system as claimed in claim 1, wherein the data includes user confidential information that has been stored in the web service.

10. A data process apparatus for providing contents to be displayed on a browser of a shared device that is shared by a plurality of users, the browser allowing each of the plurality of users to access a web service, the data process apparatus comprising:
a processor that executes a process including
authenticating a user of the plurality of users that operates the shared device,
providing an encryption key that is unique to each authenticated user to the shared device, and
providing a function-adding program to the shared device, the function-adding program configured to add a function to the browser;
wherein the function-adding program is configured to causes the browser of the shared device to encrypt data by using the encryption key that is unique to the each authenticated user in a case of storing the data in a storage area of the browser,
wherein the function-adding program is configured to causes the browser to decrypt the encrypted data by using the encryption key that is unique to the each authenticated user in a case of obtaining the data from the storage area,
wherein in a case where the authentication of the user succeeds, the authenticating includes
generating authentication data indicating that the encryption key and the user are valid,
providing the authentication data to the shared device,
managing the encryption key and the authentication data in association with the authenticated user, and
providing the encryption key associated to the authentication data in a case where the data process apparatus receives a request to obtain the encryption key added with the authentication data from the shared device.

11. The data process apparatus as claimed in claim 10,
wherein the storage area includes a persisting storage area that persistently retains the data,
wherein in a case where the encrypted data is stored in the persisting storage area, the function-adding program is configured to decrypt the encrypted data by using the encryption key and display the decrypted data,
wherein in a case where the encrypted data is not stored in the persisting storage area, the function-adding program is configured to obtain user data associated with the authenticated user, display the user data, encrypt the user data and store the encrypted user data in the persisting storage area.

12. The data process apparatus as claimed in claim 10,
wherein the storage area includes a volatile storage area that retains the data in a volatile manner,
wherein in a case where the encryption key is stored in the volatile storage area, the executing of the function-added program includes decrypting the authentication data by using the encryption key and using the decrypted authentication data, and
wherein in a case where the encryption key is not stored in the volatile storage area, the executing of the function-added program includes using the encryption key associated to the authenticated user, encrypting the authentication data with the encryption key, and storing the authentication data in the volatile storage area.

13. The data process apparatus as claimed in claim 10, wherein the providing of the function-added program includes determining whether a device is the shared device that includes the browser including the storage area shared by the plurality of users or a device that includes a browser having a storage area that is divided in correspondence with each of the plurality of users, and provide the function-added program to the shared device in the case where the determined device is the shared device.

14. The data process apparatus as claimed in claim 10, wherein the browser includes a storage area that cannot be divided in correspondence with each of the plurality of users.

15. A method for protecting data in a system having a shared device including a browser that is shared by a plurality of users, and a data process apparatus that provides contents to be displayed on the browser, the browser allowing each of the plurality of users to access a web service, the method comprising:
authenticating a user of the plurality of users that operates the shared device,
providing an encryption key that is unique to each authenticated user to the shared device, and
providing a function-adding program to the shared device that enables a function to be added to the browser,
executing, by way of the browser, the function-adding program in a case of storing data in a data storage area,
encrypting, by way of the browser of the shared device, the data by using the encryption key that is unique to the each authenticated user,
executing, by way of the browser, the function-adding program in a case of obtaining the data from the data storage area, and
decrypting, by way of the browser, the encrypted data by using the encryption key that is unique to the each authenticated user,
wherein in a case where the authentication of the user succeeds, the authenticating includes
generating authentication data indicating that the encryption key and the user are valid,
providing the authentication data to the shared device,
managing the encryption key and the authentication data in association with the authenticated user, and
providing the encryption key associated to the authentication data in case where the data process apparatus receives a request to obtain the encryption key added with the authentication data from the shared device.

16. The method as claimed in claim 15 for wherein in a case where the encryption key is stored in a volatile storage area of the browser, the executing of the function-added program includes decrypting the authentication data by using the encryption key and using the decrypted authentication data, and wherein in a case where the encryption key is not stored in the volatile storage area of the browser, the executing of the function-added program includes using the encryption key associated to the authenticated user, encrypting the authentication data with the encryption key, and storing the authentication data in the volatile storage area of the browser.

17. The method as claimed in claim 15, wherein the providing of the function-added program includes determining whether a device is the shared device that includes the browser having the storage area shared by the plurality of users or a device that includes a browser having a storage area that is divided in correspondence with each of the plurality of users, and providing the function-added program to the shared device in the case where the determined device is the shared device.

18. The method as claimed in claim 15, wherein the browser includes a storage area that cannot be divided in correspondence with each of the plurality of users.

* * * * *